US012572180B2

(12) United States Patent
Sim et al.

(10) Patent No.: US 12,572,180 B2
(45) Date of Patent: Mar. 10, 2026

(54) DISPLAY PANEL SUPPORT AND DISPLAY DEVICE INCLUDING THE SAME

(71) Applicant: SAMSUNG DISPLAY CO., LTD., Yongin-si (KR)

(72) Inventors: Jin Gyu Sim, Suwon-si (KR); Byoung Jin Jin, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 803 days.

(21) Appl. No.: 17/941,110

(22) Filed: Sep. 9, 2022

(65) Prior Publication Data

US 2023/0244276 A1 Aug. 3, 2023

(30) Foreign Application Priority Data

Jan. 28, 2022 (KR) ......................... 10-2022-0013338

(51) Int. Cl.
*G06F 1/16* (2006.01)
*G09F 9/30* (2006.01)

(52) U.S. Cl.
CPC .......... *G06F 1/1656* (2013.01); *G06F 1/1616* (2013.01); *G06F 1/1652* (2013.01)

(58) Field of Classification Search
CPC .... G06F 1/1656; G06F 1/1616; G06F 1/1652; G06F 1/1637; G06F 1/1681; G06F 1/1641; G09F 9/301
See application file for complete search history.

(56) References Cited

U.S. PATENT DOCUMENTS 10,985,333 B2 * 4/2021 Kim ...................... G06F 1/1652

FOREIGN PATENT DOCUMENTS

| KR | 10-2018-0079016 | 7/2018 |
| KR | 10-2019-0003257 | 1/2019 |
| KR | 10-2019-0066682 | 6/2019 |
| KR | 10-2020-0064376 | 6/2020 |

* cited by examiner

*Primary Examiner* — Joseph E Dean, Jr.
(74) *Attorney, Agent, or Firm* — F. CHAU & ASSOCIATES, LLC

(57) ABSTRACT

A display device includes a display panel and a panel support. The display panel includes a first surface and a second surface opposite to the first surface. The panel support is disposed on the first surface. The panel support includes a first support member including first support portions that extend in a first direction and are spaced apart from each other. The panel support includes a second support member including second support portions that extend in a second direction intersecting the first direction and are spaced apart from each other. The panel support includes a third support member including third support portions that extend in a third direction intersecting the first and second directions and are spaced apart from each other. The second support member is disposed between the first and third support members. The second support member is attached to the first and third support members.

19 Claims, 22 Drawing Sheets

SBAR: SBAR1, SBAR2, SBAR3
SSLT: SSLT1, SSLT2, SSLT3

SBAR: SBAR1, SBAR2, SBAR3
SSLT: SSLT1, SSLT2, SSLT3

BAR: BAR1, BAR2, BAR3
SLT: SLT1, SLT2, SLT3

SBAR: SBAR1, SBAR2, SBAR3
SSLT: SSLT1, SSLT2, SSLT3

SBAR: SBAR1, SBAR2, SBAR3
SSLT: SSLT1, SSLT2, SSLT3

SBAR1a: SBAR1a_1, SBAR1a_2, SBAR1a_3
SBAR2a: SBAR2a_1, SBAR2a_2, SBAR2a_3
TSLT: TSLT1, TSLT2
OSLTa: OSLTa_1, OSLTa_2, OSLTa_3

DISPLAY PANEL SUPPORT AND DISPLAY DEVICE INCLUDING THE SAME

CROSS-REFERENCE TO RELATED APPLICATION

This application claims priority under 35 U.S.C. § 119 to Korean Patent Application No. 10-2022-0013338, filed on Jan. 28, 2022 in the Korean Intellectual Property Office, the disclosure of which is incorporated by reference in its entirety herein.

1. TECHNICAL FIELD

The disclosure relates to a display panel support and a display device including the same.

2. DISCUSSION OF RELATED ART

Display devices have become increasingly important with the development of multimedia technology. Accordingly, a variety of display devices such as organic light-emitting diode display devices (OLEDs) and liquid-crystal display devices (LCDs) may be utilized in various electronic devices.

With the recent advancement in display technologies, flexible display devices are being actively studied and developed. A flexible display device can be folded, bent, and/or slid to extend or reduce a display screen to provide increased user convenience as well as a reduction in volume or the design change of a display device.

SUMMARY

Aspects of the present disclosure provide a display panel support which has a plurality of stacked metal sheets having various thicknesses, materials, and patterns, thereby providing high rigidity and low elasticity for a support of a flexible panel and having the same characteristics in any direction, and a display device including the same.

However, aspects of the disclosure are not restricted to those set forth herein. The above and other aspects of the disclosure will become more apparent to one of ordinary skill in the art to which the present disclosure pertains by referencing the detailed description of embodiments given below.

According to an embodiment of the present disclosure, a display device includes a display panel and a panel support. The display panel includes a first surface and a second surface opposite to the first surface. The panel support is disposed on the first surface. The panel support includes a first support member including first support portions that extend in a first direction. The first support portions are spaced apart from each other. A second support member including second support portions that extend in a second direction intersecting the first direction. The second support portions are spaced apart from each other. A third support member including third support portions that extend in a third direction intersecting the first direction and the second direction. The third support portions are spaced apart from each other. The second support member is disposed between the first support member and the third support member. The second support member is attached to the first support member and the third support member.

In an embodiment, at least one of the first support portions may be in direct contact with at least one of the second support portions, respectively. A least one of the second support portions may be in direct contact with at least one of the third support portions, respectively.

In an embodiment, at least one of the first support member, the second support member, and the third support member may have a different thickness from other support members of the first to third support members.

In an embodiment, the first support member, the second support member, and the third support member may have a thickness in a range of about 0.05 mm to about 0.2 mm.

In an embodiment, the display device may further comprise an upper protective member disposed on the second surface of the display panel and a window member disposed between the upper protective member and the display panel. The upper protective member and the window member may overlap the panel support in a thickness direction.

In an embodiment, the display device may further comprise a panel lower protective member disposed on the first surface of the display panel and a barrier member disposed between the panel lower protective member and the panel support. The panel lower protective member and the barrier member may overlap the panel support in the thickness direction.

In an embodiment, at least one of the first support portions, the second support portions, and the third support portions may have a different width from other support portions of the first to third support portions.

In an embodiment, the first support portions, the second support portions, and the third support portions may have a width in a range of about 0.2 mm to about 0.8 mm.

In an embodiment, the panel support may comprise first slits defined by spaces between adjacent first support portions of the first support portions, second slits defined by spaces between adjacent second support portions of the second support portions, third slits defined by spaces between adjacent third support portions of the third support portions, and overlapping slits comprising regions in which the first slits, the second slits, and the third slits may overlap each other in a thickness direction.

In an embodiment, at least two of the overlapping slits may have different shapes from each other.

In an embodiment, a first angle in a plan view between the first support portions and the second support portions and a second angle in the plan view between the second support portions and the third support portions may be in a range of about 115 to about 125 degrees and a third angle in a plan view between the second support portions and the third support portions may be in a range of about 55 to about 65 degrees.

In an embodiment, the display device may further comprise a first adhesive layer disposed between the first support member and the second support member. The first adhesive layer may be further disposed in a space between every two adjacent second support portions of the second support portions.

In an embodiment, the display device may further comprise a second adhesive layer disposed between the second support member and the third support member. The second adhesive layer may be further disposed in a space between every two adjacent third support portions of the third support portions.

In an embodiment, the first support member may include an upper surface and a lower surface opposite to the upper surface. The display device may further comprise a first protective member disposed on the upper surface of the first support member. The third support member may include an upper surface and a lower surface opposite to the upper surface. The display device may further comprise a second protective member disposed on the lower surface of the third support member.

In an embodiment, spacing between the first support portions, spacing between the second support portions, and spacing between the third support portions may be different from one another.

According to an embodiment of the present disclosure, a display device comprises a display panel and a panel support. The display panel includes a first surface and a second surface opposite to the first surface. The panel support is disposed on the first surface. The panel support includes a first support member and a second support member. The first support member includes first support portions extending in a first direction, second support portions extending in a second direction from the first support portions, the second direction intersecting the first direction, and third support portions extending in a third direction from the first support portions or the second support portions, the third direction intersecting the first direction and the second direction. The second support member comprises fourth support portions extending in the first direction, fifth support portions extending in the second direction from the fourth support portions, and sixth support portions extending in the third direction from the fourth support portions or the fifth support portions. The first support member is attached to the second support member.

In an embodiment, the panel support may comprise first slits defined by spaces between adjacent first support portions of the first support portions, adjacent second support portions of the second support portions, and adjacent third support portions of the third support portions, and second slits defined by adjacent fourth support portions of the fourth support portions, adjacent fifth support portions of the fifth support portions, and adjacent sixth support portions of the sixth support portions.

In an embodiment, the first slits and the second slits may have a triangular shape.

In an embodiment, at least one of the first slits may overlap at least one of the second slits, respectively, in a thickness direction.

According to an embodiment of the present disclosure, a display panel support comprises a first support member including first support portions that extend in a first direction. The first support portions are spaced apart from each other. A second support member includes second support portions that extend in a second direction intersecting the first direction. The second support portions are spaced apart from each other. A third support member includes third support portions that extend in a third direction intersecting the first direction and the second direction. The third support portions are spaced apart from each other. The second support member is disposed between the first support member and the third support member. The second support member is attached to the first support member and the third support member.

According to the display device in accordance with an embodiment, it is possible to resolve a problem in which a panel support needs to be separately designed or attached depending on a deformable region or direction of a flexible panel and to manufacture a panel support that is universally applicable to a flexible display, such as a foldable display device, a rollable display device, a stretchable display device, a slidable display device, and the like, irrespective of the deformable region or direction of the flexible panel.

However, the effects of the embodiments are not restricted to the one set forth herein.

4

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF EMBODIMENTS

The invention will now be described more fully hereinafter with reference to the accompanying drawings, in which embodiments of the present disclosure are shown. The present disclosure may, however, be embodied in different forms and should not be construed as limited to the embodiments set forth herein.

It will also be understood that when a layer is referred to as being "on" another layer or substrate, it can be directly on the other layer or substrate, or intervening layers may also be. When a layer is referred to as being "directly on" another layer or substrate, no intervening layers may be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Features of each of various embodiments of the present disclosure may be partially or entirely combined with each other and may technically variously interwork with each other, and respective embodiments may be implemented independently of each other or may be implemented together in association with each other.

Hereinafter, embodiments of the present disclosure will be described with reference to the attached drawings.

Figure 1:
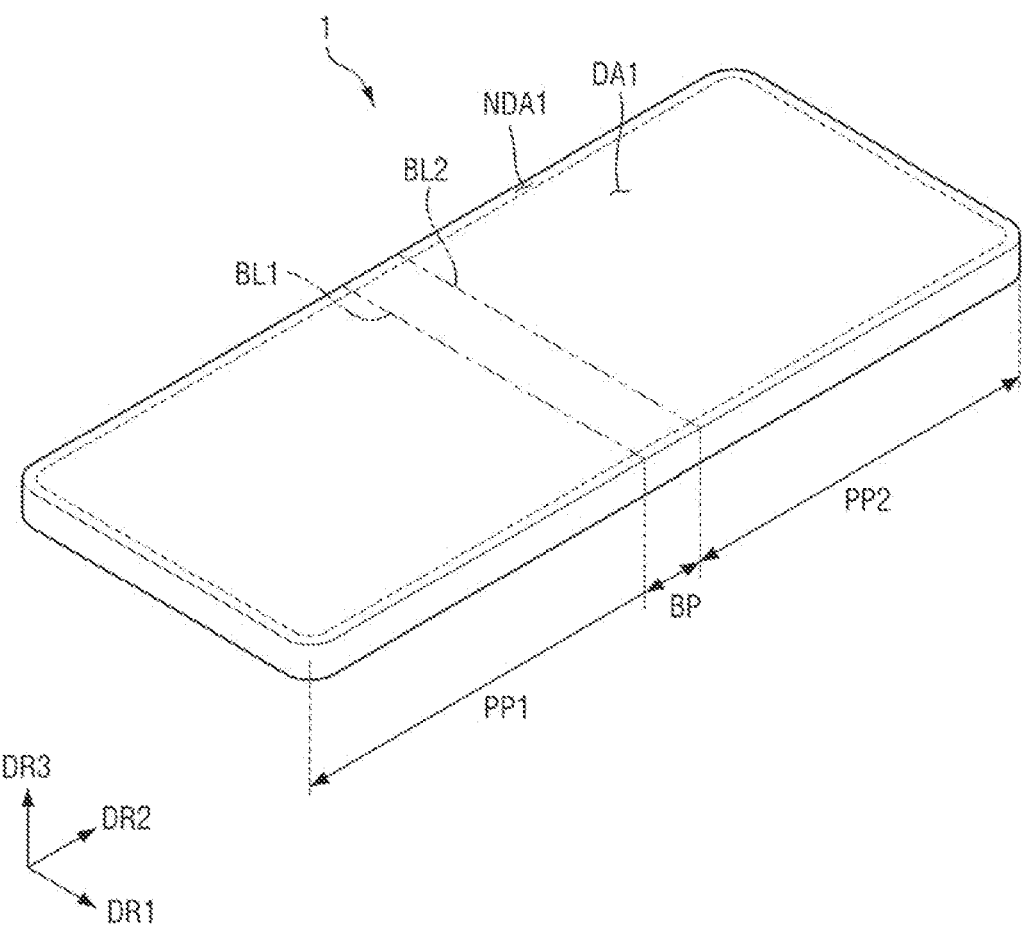
FIG. 1 is a perspective view illustrating a display device according to an embodiment of the present disclosure.
Figure 2:
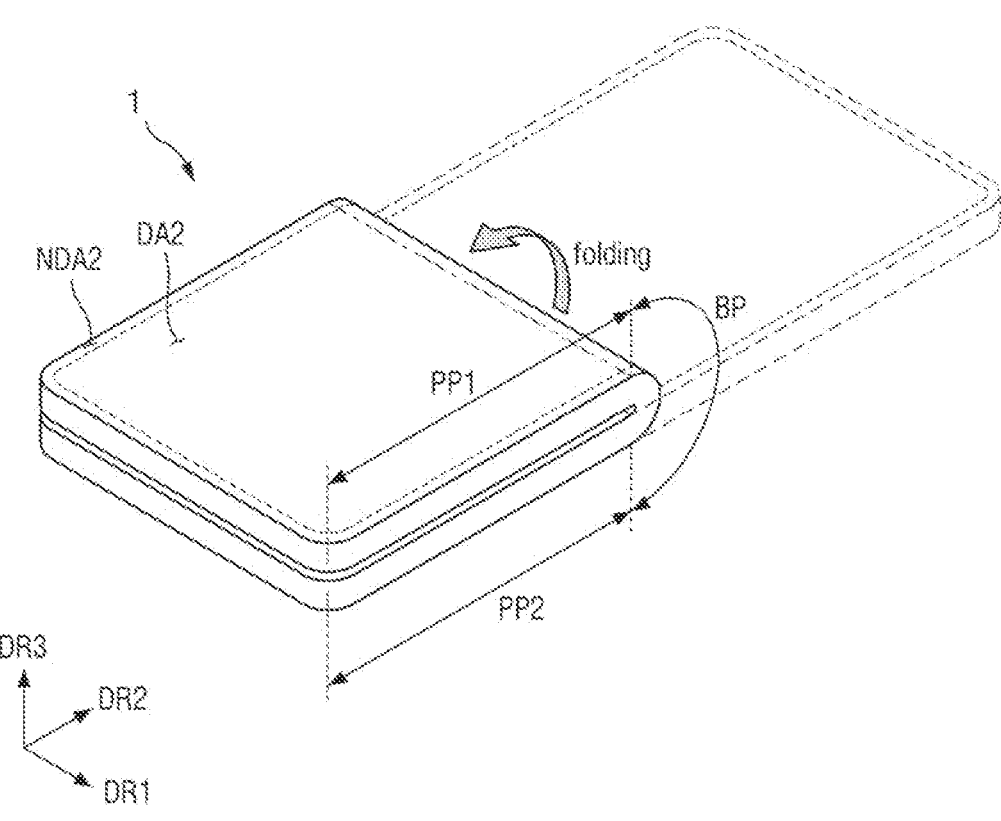
FIG. 2 is a perspective view illustrating a folded state of a display device according to an embodiment of the present disclosure.

FIG. 1 is a perspective view illustrating a display device according to an embodiment of the present disclosure. FIG. 2 is a perspective view illustrating a folded state of a display device according to an embodiment of the present disclosure.

FIG. 1 shows a first state in which a display device 1 is an unfolded state in which the display device 1 is not folded along folding lines, and FIG. 2 shows a second state in which the display device 1 is in a folded state in which the display device 1 is folded along the folding lines.

Referring to FIGS. 1 and 2, the display device 1 may be foldable, stretchable, flexible, bendable, or rollable. In an embodiment, the display device 1 may be applied to a smartphone. However, embodiments of the present disclosure are not necessarily limited thereto.

For example, the display device 1 is a device for displaying at least one moving image and/or still image. The display device may be used as a display screen of various products such as televisions, laptop computers, monitors, billboards and the Internet of Things (IOT) as well as portable electronic devices such as mobile phones, smart phones, tablet personal computers (tablet PCs), smart watches, watch phones, mobile communication terminals, electronic notebooks, electronic books, portable multimedia players (PMPs), navigation systems, and ultra mobile PCs (UMPCs). However, embodiments of the present disclosure are not necessarily limited thereto.

The display device 1 has a three-dimensional shape. In the drawings, a direction parallel to a first side (vertical side) of the display device 1 is referred to as a first direction DR1, a direction parallel to a second side (horizontal side) of the display device 1 is referred to as a second direction DR2, and a thickness direction of the display device 1 is referred to as a third direction DR3. In the following description, the term "direction" may refer to all directions toward both sides extending along the direction unless specifically stated otherwise. In addition, when it is necessary to distinguish between both directions toward both sides, one side is referred to a "first side" in the direction, and the other side is referred to as a "second side" in the direction. In FIG. 1, a side in a direction in which an arrow is pointed is referred to as a first side and a side in the opposite direction is referred to a second side. In an embodiment, the first direction DR1 to the third direction DR3 may be perpendicular to one another. However, embodiments of the present disclosure are not necessarily limited thereto.

The display device 1 may have a quadrilateral shape, such as a rectangular shape, having vertical sides shorter than horizontal sides, in a plan view, as shown in FIG. 1. Each corner of the display device 1 may be right-angled or rounded in a plan view. However, embodiments of the present disclosure are not necessarily limited thereto.

The display device 1 includes a first flat portion PP1, a bending portion BP, and a second flat portion PP2.

The first flat portion PP1 and the second flat portion PP2 may be always-flat portions that are not bent. The first flat portion PP1 is a part of the display device 1, which may be disposed on a second side in the second direction DR2. The second flat portion PP2 is a part of the display device, which may be disposed on a first side in the second direction DR2.

The bending portion BP may be a bendable area. The bending portion BP may be disposed between the first flat portion PP1 and the second flat portion PP2 (e.g., in the second direction DR2). For example, the second flat portion PP2 may be disposed on a first side of the bending portion in the second direction DR2 and the first flat portion PP1 may be disposed on a second side of the bending portion BP in the second direction DR2.

The bending portion BP may be an area defined by a first bending line BL1 and a second bending line BL2. The first bending line BL1 and the second bending line BL2 may be positions where the bending portion BP is bent. The first bending line BL1 is a boundary where the first flat portion PP1 and the bending portion BP adjoin each other, and the second bending line BL2 is a boundary where the second flat portion PP2 and the bending portion BP adjoin each other. The first bending line BL1 and the second bending line BL2 may extend in the first direction DR1. However, embodiments of the present disclosure are not necessarily limited thereto.

When the bending portion BP is not bent, the display device 1 maintains an unfolded state (hereinafter referred to as a "first state") as shown in FIG. 1. When the bending portion BP is bent, the display device 1 maintains a folded state (hereinafter referred to as a "second state") as shown in FIG. 2. In an embodiment, the display device 1 may be switched from the first state to the second state by being folded in the second direction DR2 along the first bending line BL1 and the second bending line BL2. As a result, the display device 1 may be reduced to approximately half the original length in the second direction DR2 so that a user can easily carry the display device 1 for increased portability.

The display device 1 includes a display area and a non-display area.

The display area may be an area which includes pixels and display a screen. The display area may include a first display area DA1 and a second display area DA2. The non-display area may be an area which does not display an image. The non-display area may include a first non-display area NDA1 and a second non-display area NDA2. In the first state of the display device 1, a surface on the first side of the display device 1 in the third direction DR3 may be a front surface on which the first display area DA1 and the first non-display area NDA1 are disposed, and a surface on the second side of the display device 1 in the third direction DR3 may be a rear surface on which the second display area DA2 and the second non-display area NDA2 are disposed.

In the first state of the display device 1, the first display area DA1 may be disposed on the surface on the first side of the display device 1 in the third direction DR3 and may overlap the first flat portion PP1, the bending portion BP, and the second flat portion PP2 in the third direction DR3 as shown in FIG. 1. For example, in the first state of the display device 1, the surfaces on the first side of the first flat portion PP1, the bending portion BP, and the second flat portion PP2 in the third direction DR3 may be front surfaces on which the first display area DA1 is disposed, and the surfaces on the second side of the first flat portion PP1, the bending portion BP, and the second flat portion PP2 in the third direction DR3 may be the rear surfaces on which the first display area DA1 is not disposed. In an embodiment, the planar shape of the first display area DA1 may follow the planar shape of the display device 1 in the first state. For example, when the planar shape of the display device 1 in the first state is a rectangular shape, the planar shape of the first display area DA1 may also be a rectangular shape.

The first non-display area NDA1 may be disposed around the first display area DA1 (e.g., in the first and/or second directions DR1, DR2). In an embodiment, the first non-display area NDA1 may be disposed to completely surround the first display area DA1. However, embodiments of the present disclosure are not necessarily limited thereto. For example, the first display area DA1 may be partially surrounded by the first non-display area NDA1 and at least one side of the first display area DA1 may extend to an edge of the display device 1.

In an embodiment, in the first state of the display device 1, the second display area DA2 may be disposed on a surface on the second side of the display device 1 in the third direction DR3 and may overlap only the first flat portion PP1. However, embodiments of the present disclosure are not necessarily limited thereto. The second display area DA2 may display an image to the user when the display device 1 is in the second state. For example, the second display area DA2 may be disposed on the rear surface of the first flat portion PP1, and may not be disposed on the rear surfaces of the bending portion BP and the second flat portion PP2. In an embodiment, the planar shape of the second display area DA2 may follow the planar shape of the display device 1 in the second state as shown in FIG. 2. For example, when the planar shape of the display device 1 in the first state is a rectangular shape, the planar shape of the first display area DA1 may also be a rectangular shape.

In the first state of the display device 1, the second non-display area NDA2 may be disposed around the second display area DA2 (e.g., in the first and/or second directions DR1, DR2) and may overlap the bending portion BP and the second flat portion PP2 in the third direction DR3. For example, the second display area DA2 may not be disposed on the rear surfaces of the bending portion BP and the second flat portion PP2 and may be disposed only on the rear surface of the first flat portion PP1. However, embodiments of the present disclosure are not necessarily limited thereto. In an embodiment, the second non-display area NDA2 may be disposed to completely surround the second display area DA2 (e.g., in the first and second directions DR1, DR2). However, embodiments of the present disclosure are not necessarily limited thereto. For example, in an embodiment the second display area DA2 may be partially surrounded by the second non-display area NDA2.

As shown in FIG. 2, in the third state, the display device 1 may be folded in an in-folding manner such that a part of the first display area DA1 overlapping the first flat portion PP1 and a part of the first display area DA1 overlapping the second flat portion PP2 face each other. However, embodiments of the present disclosure are not necessarily limited thereto. For example, the display device 1 may be folded in an out-folding manner such that the rear surfaces of the display device 1 face each other.

Figure 3:
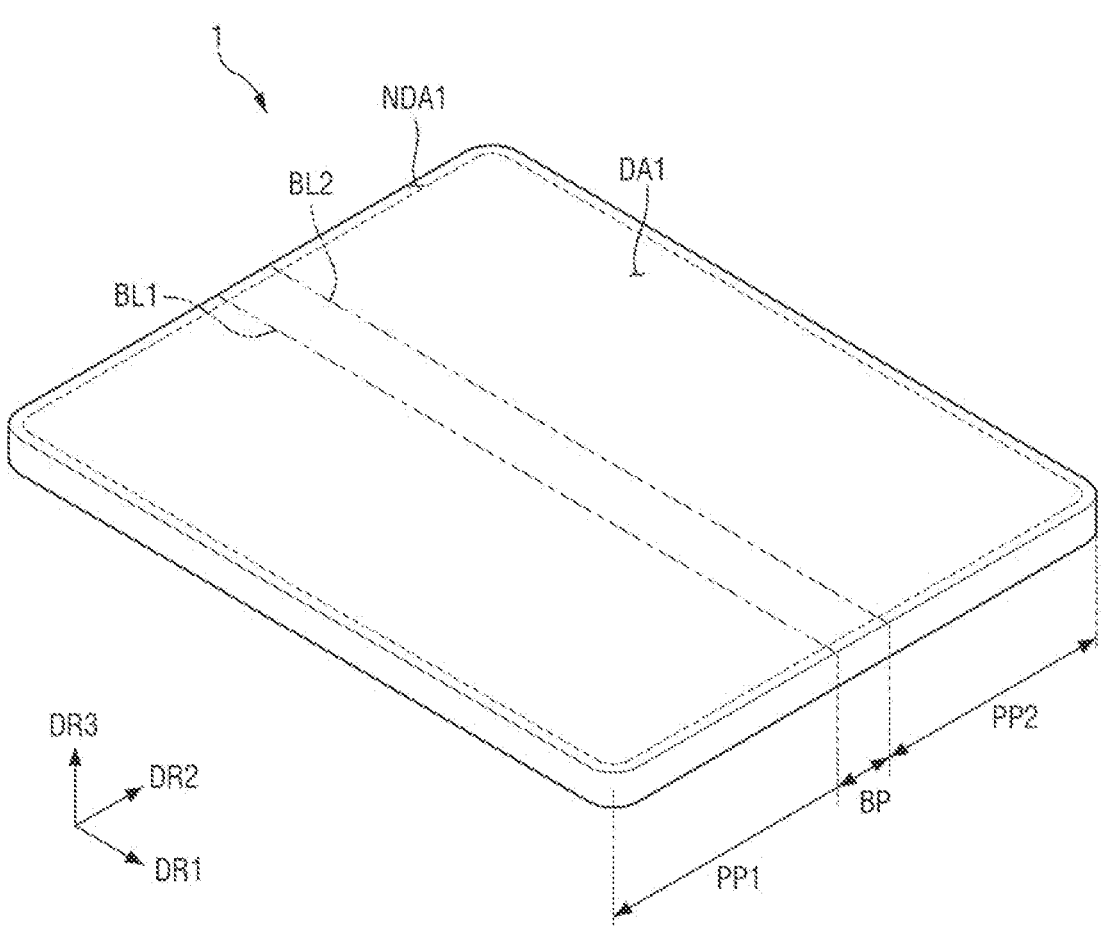
FIG. 3 is a perspective view illustrating a first state of a display device according to an embodiment of the present disclosure.
Figure 4:
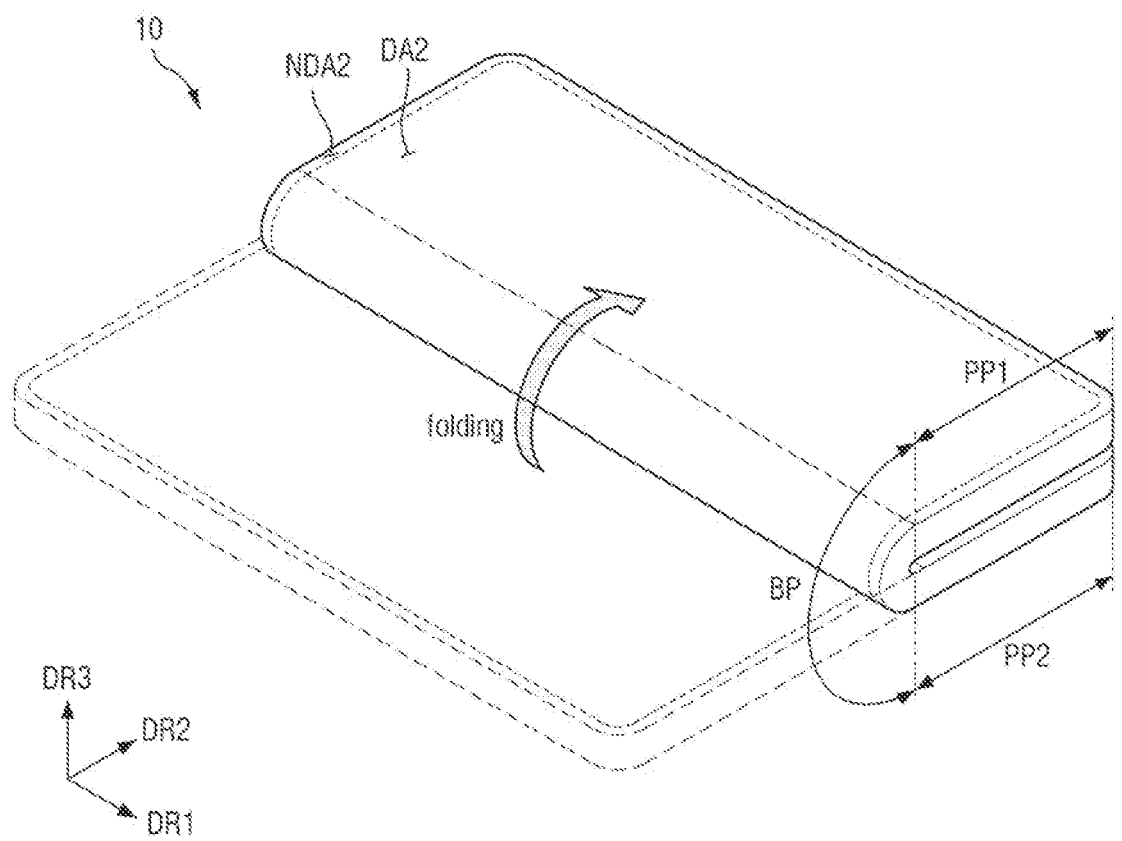
FIG. 4 is a perspective view illustrating a second state of the display device of FIG. 3 according to an embodiment of the present disclosure.

FIG. 3 is a perspective view illustrating a first state of a display device according to an embodiment of the present disclosure. FIG. 4 is a perspective view illustrating a second state of the display device of FIG. 3.

Embodiments shown in FIGS. 3 and 4 differ from an embodiment shown in FIGS. 1 and 2 only in that the planar shape of the display device 1 is a rectangular shape having vertical sides that are longer than horizontal sides. Thus, in FIGS. 3 and 4, descriptions redundant to the embodiment of FIGS. 1 and 2 will be omitted for convenience of explanation.

Figure 5:
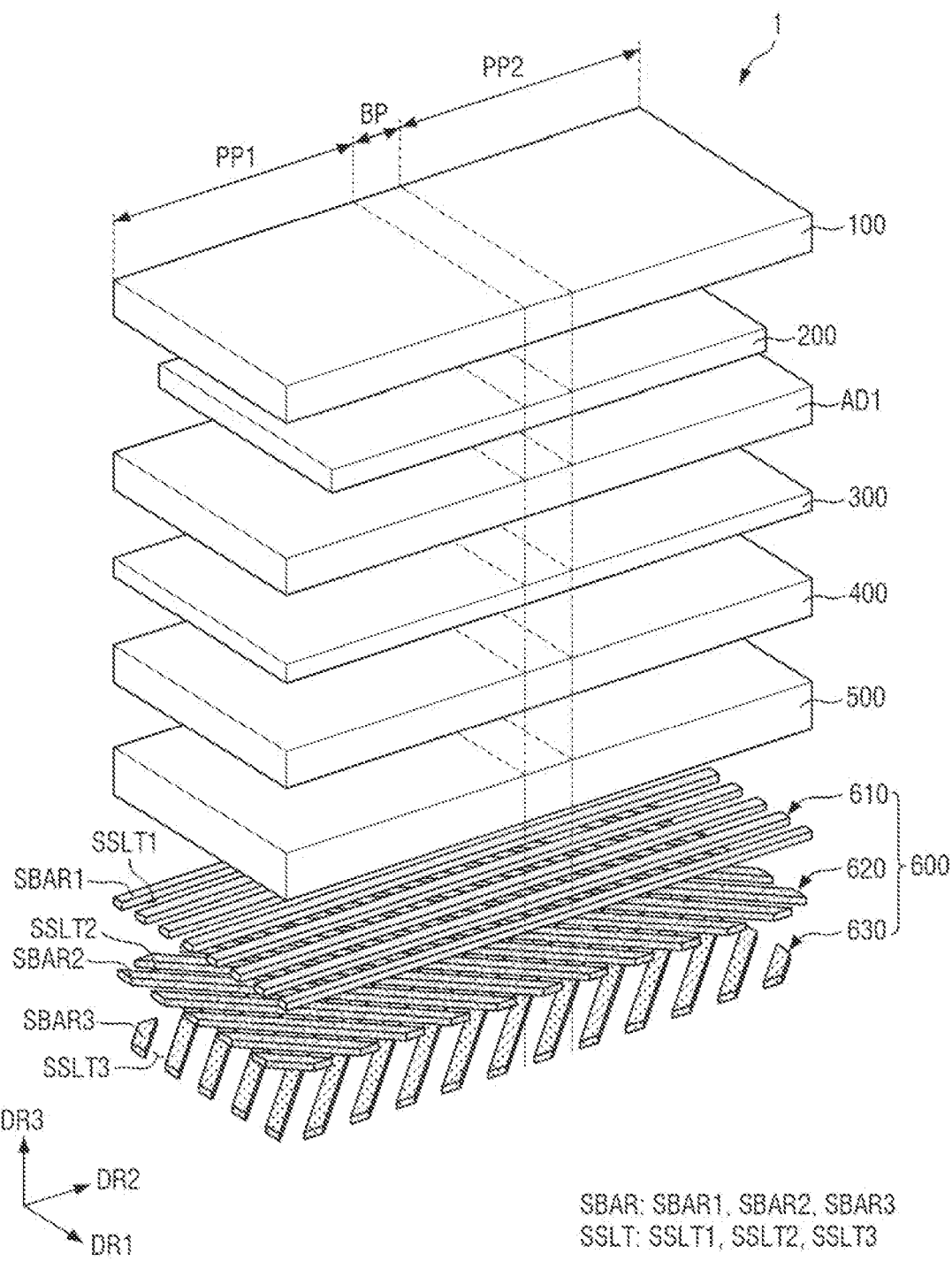
FIG. 5 is an exploded perspective view of the display device of FIG. 1 according to an embodiment of the present disclosure.

FIG. 5 is an exploded perspective view of the display device of FIG. 1.

Referring to FIG. 5, a display device 1 according to an embodiment may include an upper protective member 100, a window member 200, a first adhesive member AD1, a display panel 300, a panel lower member 400, a barrier member 500, and a panel support 600. In an embodiment, a first side of one element in the third direction DR3 may be expressed as an upper side, and a second side of the element in the third direction DR3 may be expressed as a lower side.

The upper protective member 100 may perform at least one function including scattering prevention or reduction, impact absorbing, nailing prevention or reduction, fingerprint prevention or reduction, and anti-glare of the window member 200 which will be described below. The upper protective member 100 may be disposed on a surface (hereinafter referred to as a "front surface") on the first side of the window member 200 in the third direction DR3. In an embodiment, the upper protective member 100 may be attached to the front surface of the window member 200 by an adhesive member, such as a pressure sensitive adhesive (PSA).

In an embodiment, a light-blocking pattern may be formed on a surface (hereinafter referred to as a "rear surface") on the second side of the upper protective member 100 in the third direction DR3. The light-blocking pattern may be disposed on, or close to, the edge of the upper protective member 100. The light-blocking pattern may include a light-blocking material that blocks light. For example, in an embodiment the light-blocking pattern may be an inorganic block pigment, an organic black pigment, or an opaque metal material.

The window member 200 may serve to protect the display panel 300, which will be described below, from the outside. The window member 200 may be disposed on a surface (hereinafter referred to as a "front surface") on one side of the display panel 300 in the third direction DR3. The window member 200 may be formed of a transparent material. For example, in an embodiment the transparent material may be glass or plastic. In an embodiment, the window member 200 may be ultra-thin glass with a thickness of about 0.1 mm or less or a transparent polyimide film. The window member 200 may be attached to the front surface of the display panel 300 by the first adhesive member AD1. In an embodiment, the first adhesive member AD1 may be a transparent adhesive film or a transparent adhesive resin.

The display panel 300 is a panel that displays an image. The display panel 300 may be any type of display panel, such as an organic light emitting display panel including an organic light emission layer, a micro light emitting diode (LED) display panel using a micro LED, a quantum dot light emitting display panel using a quantum dot light emitting diode including a quantum dot emission layer, and an inorganic light emitting display panel using an inorganic light emitting element including an inorganic semiconductor. Referring to FIG. 1, the display panel 300 may display an image on the first side in the third direction DR3.

The panel lower member 400 may support the display panel 300 and may serve to protect a rear surface of the display panel 300. The panel lower member 400 may be disposed on a surface (hereinafter referred to as a "rear surface") on the second side of the display panel 300 in the third direction DR3. In an embodiment, the panel lower member 400 may be plastic, such as polyethyleneterephthalate or polyimide. However, embodiments of the present disclosure are not necessarily limited thereto.

The barrier member 500 may be disposed on a surface (hereinafter referred to as a "rear surface") on the first side of the panel lower member 400 in the third direction DR3. The barrier member 500 may include at least one of a light-blocking layer for absorbing light incident from outside or a heat dissipation layer for effectively discharging heat from the display panel 300.

The light-blocking layer blocks the transmission of light to prevent the elements disposed thereunder, for example, the panel support 600, which will be described below, from being seen from above the display panel 300. In an embodiment, the light-blocking layer may include a light-absorbing material such as a black pigment and a black dye.

The heat dissipation layer may include a first heat dissipation layer including graphite or carbon nanotubes, and a second heat dissipation layer formed of a thin metal film such as copper, nickel, ferrite, and silver, which can block electromagnetic waves and have high thermal conductivity.

The panel support 600 includes a plurality of support members stacked therein. The panel support 600 may be disposed on the rear surface of the barrier member 500 and may serve to support a bottom surface of the display panel 300. For example, in an embodiment the panel support 600 is disposed to correspond to the first flat portion PP1, the bending portion BP, and the second flat portion PP2, and accordingly, may be disposed on the entire rear surface of the display panel 300.

In an embodiment, the panel support 600 may include a first support member 610, a second support member 620, and a third support member 630. The first support member 610, the second support member 620, and the third support member 630 may be sequentially disposed on the rear surface of the barrier member 500.

For example, the first support member 610 is disposed on the rear surface of the barrier member 500, the second support member 620 is disposed on the rear surface of the first support member 610, and the third support member 630 is disposed on the rear surface of the second support member, so that the panel support 600 may have a structure in which the first support member 610 and the third support member 630 are stacked with the second support member 620 interposed therebetween. However, embodiment of the present disclosure are not necessarily limited thereto and the order in which the first support member 610, the second support member 620, and the third support member 630 are stacked in the panel support 600 may vary.

The first to third support members 610 to 630 included in the panel support 600 may include a material having high rigidity. For example, in an embodiment the first support member 610, the second support member 620, and the third support member 630 may include stainless steel, such as SUS316. However, embodiments of the present disclosure are not necessarily limited thereto and the materials of the first support member 610, the second support member 620, and the third support member 630 may vary.

The first support member 610, the second support member 620, and the third support member 630 may all be the same type of metal layers, or may be different types of metal layers from each other in some embodiments.

The first support member 610, the second support member 620, and the third support member 630 may each include a plurality of support member bars SBAR (e.g., support portions) extending in a direction and spaced apart from each other and a plurality of support member slits SSLT defined by the spaces between the plurality of support member bars SBAR, wherein the direction in which the plurality of support member bars SBAR in the first support member 610 extend, the direction in which the plurality of support member bars SBAR in the second support member 620 extend, and the direction in which the plurality of support member bars SBAR in the third support member 630 extend are different from one another.

For example, as each of the first support member 610, the second support member 620, and the third support member 630 includes the plurality of support member bars SBAR extending in the different directions and the plurality of support member slits SSLT defined by the spaces between the plurality of support member bars SBAR. The first support member 610, the second support member 620, and the third support member 630 may each have a different stripe pattern in a plan view.

The plurality of support member bars SBAR and the plurality of support member slits SSLT included in each of the first support member 610, the second support member 620, and the third support member 630 will be described in detail with reference to FIGS. 6 to 14.

Figure 6:
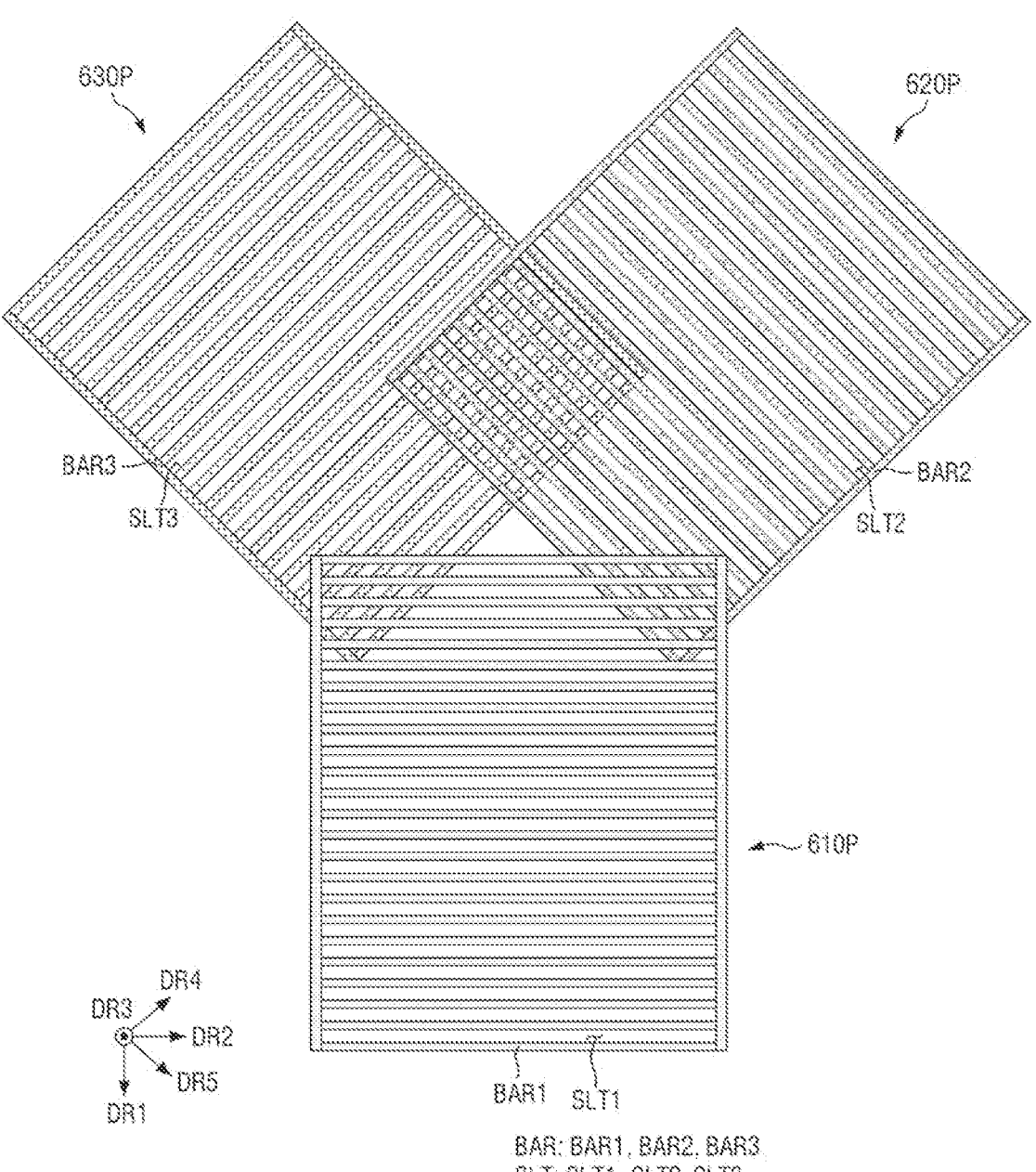
FIG. 6 is a plan view illustrating a first mother support member, a second mother support member, and a third mother support member included in a mother panel support according to an embodiment of the present disclosure.
Figure 7:
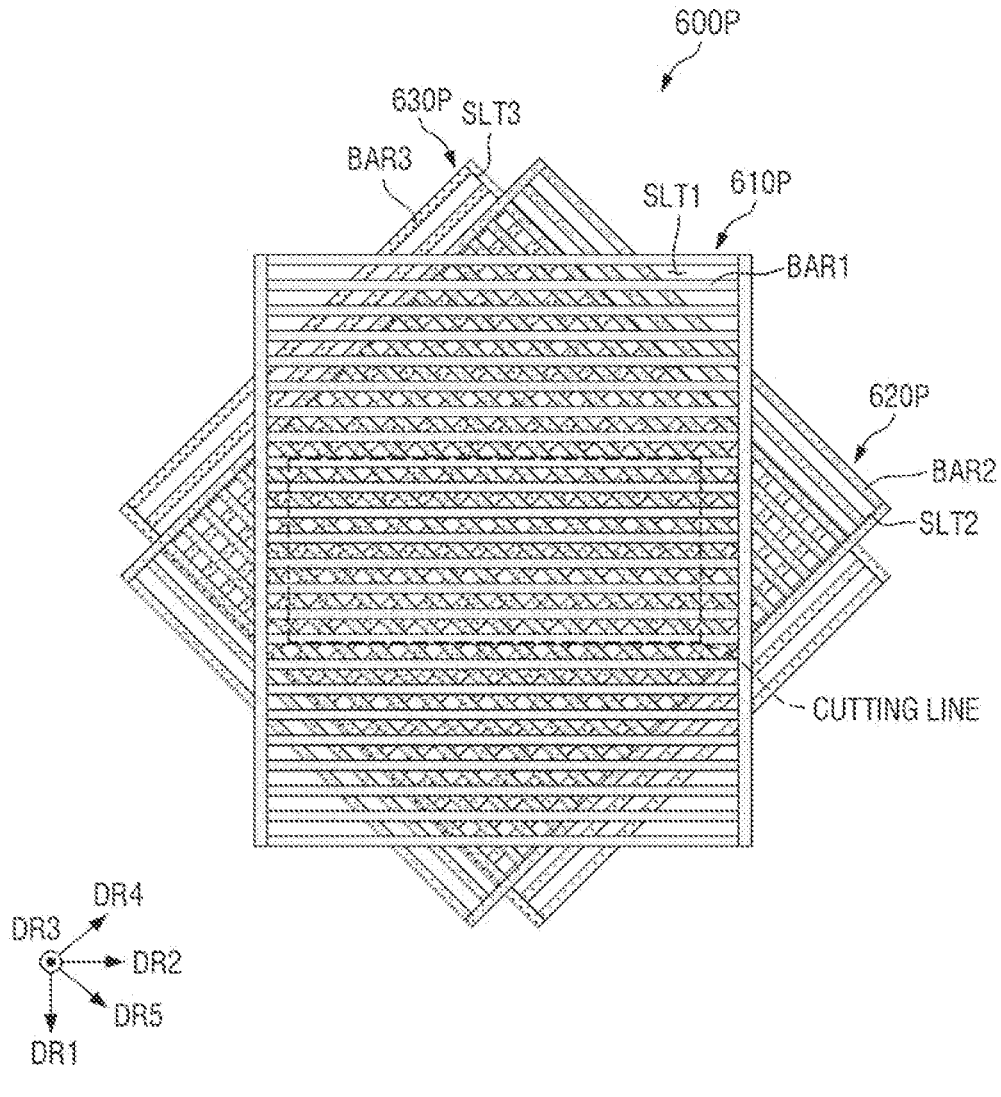
FIG. 7 is a plan view illustrating a stacked state of the first mother support member, the second mother support member, and the third mother support member included in the mother panel support according to an embodiment of the present disclosure.

FIG. 6 is a plan view illustrating a first mother support member, a second mother support member, and a third mother support member included in a mother panel support. FIG. 7 is a plan view illustrating a stacked state of the first mother support member, the second mother support member, and the third mother support member included in the mother panel support.

Referring to FIG. 6, a first mother support member 610p, a second mother support member 620p, and a third mother support member 630p may include a plurality of bars BAR extending in a horizontal direction and a plurality of slits SLT defined by spaces between the plurality of bars BAR, and may have a stripe pattern in plan view.

The plurality of bars BAR included in the first mother support member 610p, the second mother support member 620p, and the third mother support member 630p may be regions in which materials constituting the first mother support member 610p, the second mother support member 620p, and the third mother support member 630p remain. The plurality of slits SLT may be regions where a part of the materials constituting the first mother support member 610p, the second mother support member 620p, and the third mother support member 630p is not present.

For example, the first mother support member 610p may include a plurality of first bars BAR1 extending in the horizontal direction and a plurality of first slits SLT1 defined by the spaces between the plurality of first bars BAR1 and extending in the horizontal direction, and may have a stripe pattern in plan view since the plurality of first bars BAR1 and the plurality of first slits SLT1 are alternately arranged.

The second mother support member 620*p* may include a plurality of second bars BAR2 extending in the horizontal direction and a plurality of second slits SLT2 defined by the spaces between the plurality of second bars BAR2 and extending in the horizontal direction, and the plurality of second bars BAR2 and the plurality of second slits SLT2 may be alternately arranged.

The third mother support member 630*p* may include a plurality of third bars BAR3 extending in the horizontal direction and a plurality of third slits SLT3 defined by the spaces between the plurality of third bars BAR3 and extending in the horizontal direction, and the plurality of third bars BAR3 and the plurality of third slits SLT3 may be alternately arranged.

Therefore, like the first mother support member 610*p*, the second mother support member 620*p* and the third mother support member 630*p* may also have a stripe pattern in a plan view.

In an embodiment, the first mother support member 610*p*, the second mother support member 620*p*, and the third mother support member 630*p* may include the same material, which has high rigidity. For example, the first mother support member 610*p*, the second mother support member 620*p*, and the third mother support member 630*p* may include stainless steel, such as SUS316. However, embodiments of the present disclosure are not necessarily limited thereto and the materials of the first mother support member 610*p*, the second mother support member 620*p*, and the third mother support member 630*p* may vary. In addition, in some embodiments, the first mother support member 610*p*, the second mother support member 620*p*, and the third mother support member 630*p* may include different materials from each other.

In an embodiment of FIG. 6, the width and shape of each of the plurality of bars BAR included in the first mother support member 610*p*, the second mother support member 620*p*, and the third mother support member 630*p* and the distance between the plurality of bars BAR may be constant. However, in some embodiments, the width and shape of each of the plurality of bars BAR included in the first mother support member 610*p*, the second mother support member 620*p*, and the third mother support member 630*p* and the distance between the plurality of bars BAR may be different from each other.

Referring to FIG. 7, the plurality of first bars and the first slits SLT1 included in the first mother support member 610*p* may be disposed to extend toward the second direction DR2, the second mother support member 620*p* may be rotated clockwise (see FIG. 7) at an angle in a range of about 115 to about 125 degrees relative to the first mother support member 610*p* and be disposed on the rear surface of the first mother support member 610*p*, and the third mother support member 630*p* may be rotated counterclockwise at an angle in a range of about 115 to about 125 degrees relative to the first mother support member 610*p* and be disposed on the rear surface of the second mother support member 620*p*. Accordingly, a mother panel support 600*p* may be formed in which the first mother support member 610*p*, the second mother support member 620*p*, and the third mother support member 630*p* having the plurality of bars BAR and the plurality of slits SLT extending in different directions from each other are stacked.

For example, the plurality of first bars BAR1 and the plurality of first slits SLT1 included in the first mother support member 610*p* may extend in the second direction DR2, the plurality of second bars BAR2 and the plurality of second slits SLT2 included in the second mother support member 620*p* may overlap the plurality of first bars BAR1 and the plurality of first slits SLT in the third direction DR3 and extend in a fifth direction DR5.

In addition, the plurality of third bars BAR3 included in the third mother support member 630*p* may overlap the plurality of first bars BAR1 and the plurality of second bars BAR2 in the third direction DR3 and extend in a fourth direction DR4, and the plurality of third slits SLT3 may overlap the plurality of first slits SLT1 and the plurality of second slits SLT2 in the third direction DR3 and extend in the fourth direction DR4.

Thus, the plurality of bars BAR and the plurality of slits SLT extend in different directions in the first mother support member 610*p*, the second mother support member 620*p*, and the third mother support member 630*p*, respectively, and the first mother support member 610*p*, the second mother support member 620*p*, and the third mother support member 630*p* are stacked so that the mother panel support 600*p* may have a mesh pattern or a mesh pattern area in a plan view.

Figure 11:
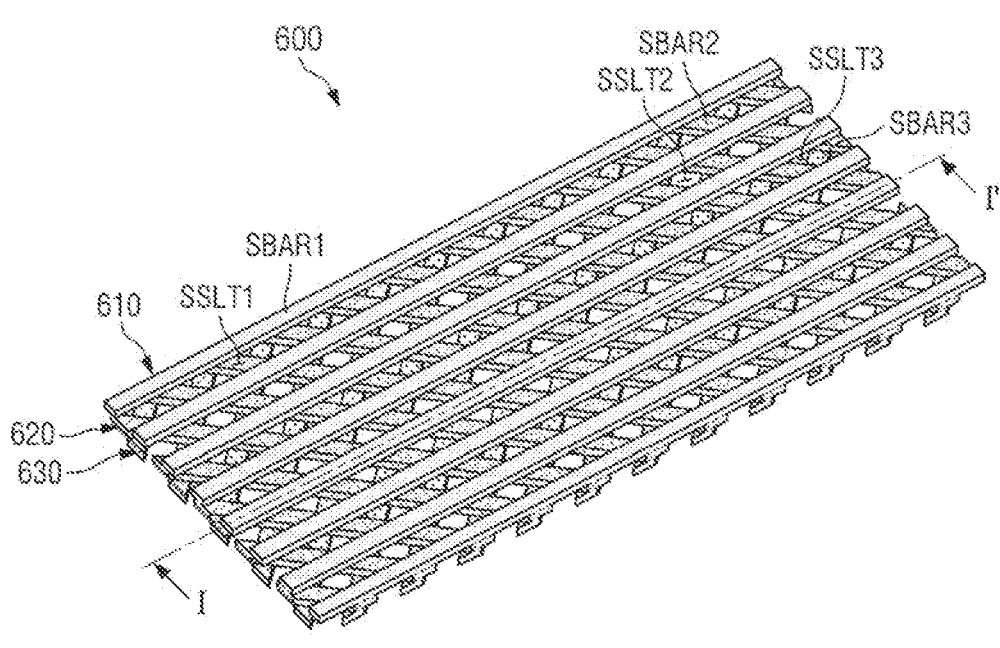
FIG. 11 is a perspective view illustrating a panel support according to an embodiment of the present disclosure.
Figure 11:
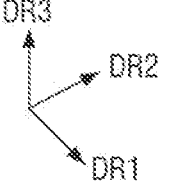

In an embodiment, the mesh pattern or mesh pattern area included in the panel support 600*p* may be cut into a rectangular shape to manufacture the panel support 600 shown in FIG. 11.

However, the cut shape of the mother panel support 600*p* is not necessarily limited to a rectangular shape, and the panel support 600 may be manufactured in various shapes according to the shape of the display device or the shape of the display panel in some embodiments.

Hereinafter, the panel support 600 will be described in detail with reference to FIGS. 8 to 14.

Figure 8:
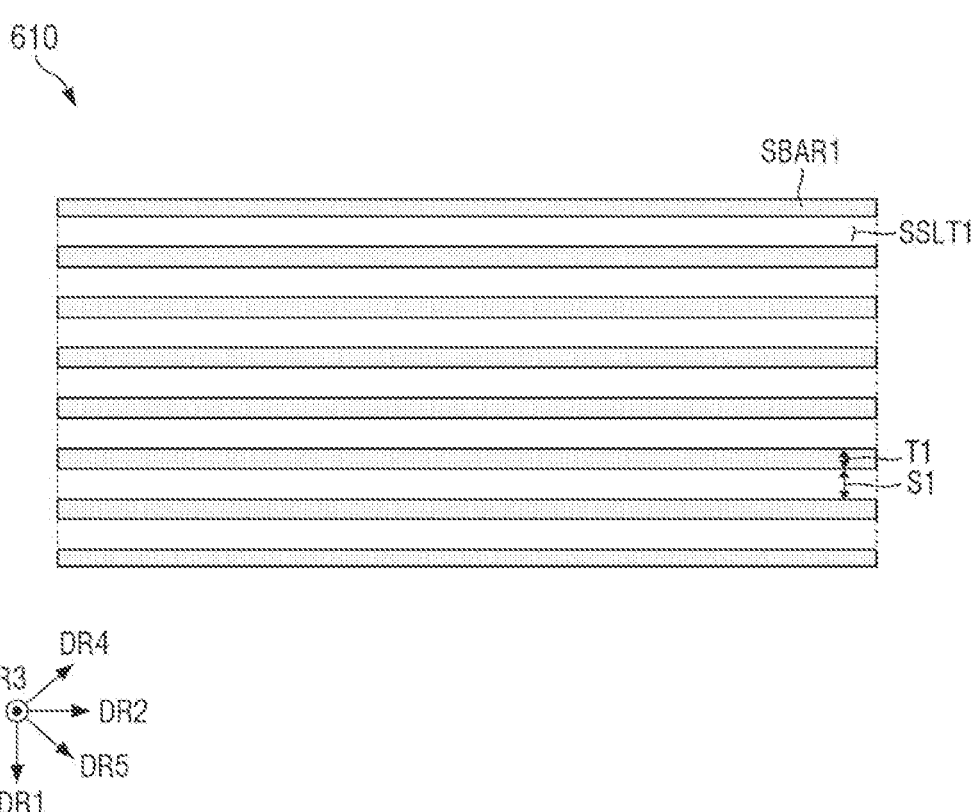
FIG. 8 is a plan view illustrating a first support member included in a panel support according to an embodiment of the present disclosure.
Figure 9:
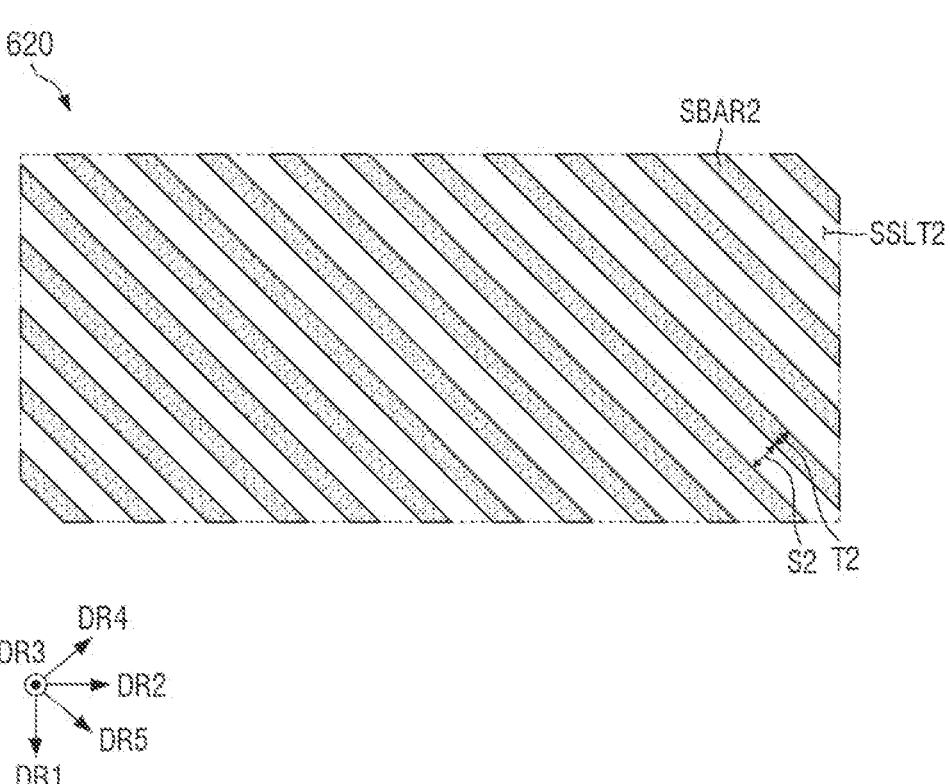
FIG. 9 is a plan view illustrating a second support member included in a panel support according to an embodiment of the present disclosure.
Figure 10:
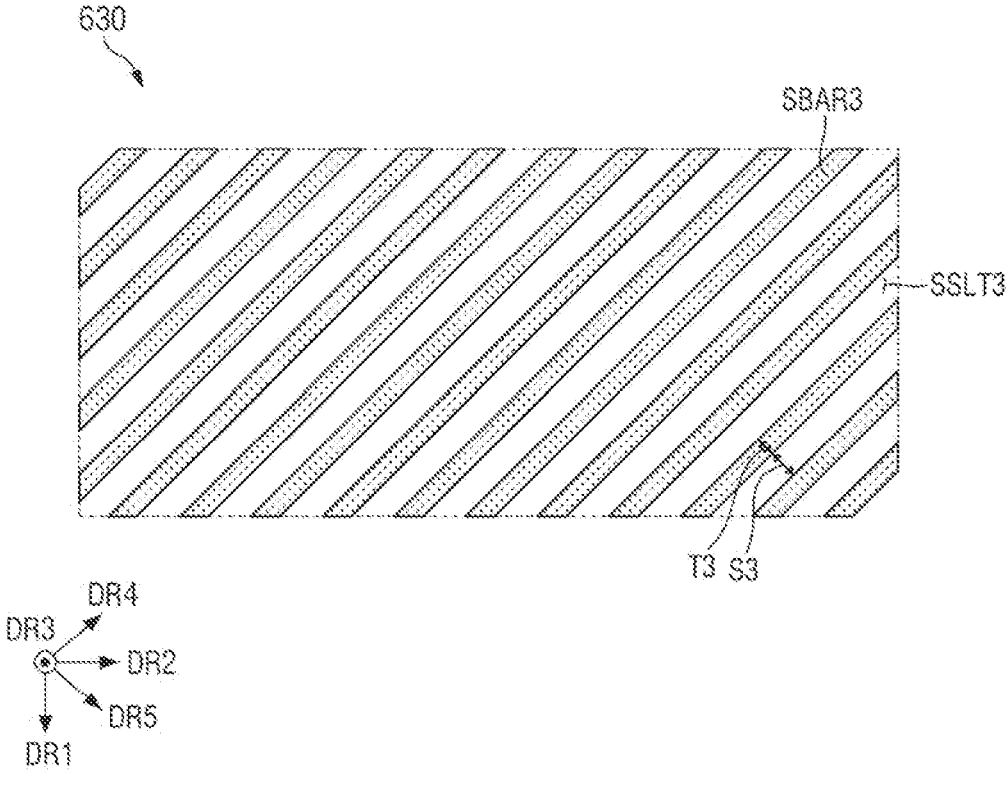
FIG. 10 is a plan view illustrating a third support member included in a panel support according to an embodiment of the present disclosure.

FIG. 8 is a plan view illustrating a first support member included in a panel support according to an embodiment of the present disclosure. FIG. 9 is a plan view illustrating a second support member included in a panel support according to an embodiment of the present disclosure. FIG. 10 is a plan view illustrating a third support member included in a panel support according to an embodiment of the present disclosure.

In FIGS. 8 to 12, the numbers of the support member bars SBAR and the support member slits SSLT included in each of a first support member 610, a second support member 620, and a third support member 630 included in the panel support 600 are merely illustrative for the sake of explanation, and the first support member 610, the second support member 620, and the third support member 630 may each include more or less support member bars SBAR and more or less support member slits SSLT.

Referring to FIGS. 6 to 10, the panel support 600 is manufactured by cutting the mother panel support 600*p* including the first mother support member 610*p*, the second mother support member 620*p*, and the third mother support member 630*p*, as described above, and thus the first support member 610, the second support member 620, and the third support member 630 included in the panel support 600 may be a part of the first mother support member 610*p*, the second mother support member 620*p*, and the third mother support member 630*p*, respectively.

In addition, the first support member 610 may include a plurality of first support member bars SBAR1 which are a part of the first bars BAR1 included in the first mother support member 610*p* and a plurality of first support member slits SSLT1 defined by the spaces between the plurality of first support member bars SBAR1. The second support member 620 may include a plurality of second support member bars SBAR2 which are a part of the second bars BAR2 included in the second mother support member 620p and a plurality of second support member slits SSLT2 defined by the spaces between the plurality of second support member bars SBAR2. The third support member 630 may include a plurality of third support member bars SBAR3 which are a part of the third bars BAR3 included in the third mother support member 630p and a plurality of third support member slits SSLT3 defined by the spaces between the plurality of third support member bars SBAR3.

Referring to FIG. 8, in an embodiment, in the first support member 610, the first support member bars SBAR1 and the first support member slits SSLT1 may be alternately arranged along the first direction DR1. For example, the first support member bars SBAR1 may be disposed to be spaced apart from one another along the first direction DR1 with the first support member slits SSLT1 respectively interposed between every two adjacent first support member bars SBAR1 and thus form a stripe pattern extending in the second direction DR2 in plan view.

In an embodiment, the plurality of first support member bars SBAR1 may each have a rectangular shape extending in the second direction DR2. For example, each of the plurality of first support member bars SBAR1 may have long sides in the second direction DR2 and short sides in the first direction DR1.

The first support member slits SSLT1 may have a substantially same or similar shape as the first support member bars SBAR1, and each of the plurality of first support member slits SSLT1 may be a hole penetrating the panel support 600 in the third direction DR3.

However, embodiments of the present disclosure are not necessarily limited thereto and the shapes of the first support member bars SBAR1 and the first support member slits SSLT1 may vary.

In an embodiment, the width of each of the first support member bars SBAR1 included in the first support member 610 may be in a range of about 0.2 mm to about 0.8 mm. In an embodiment in which the width T1 of each of the bars BAR1 is about 0.2 mm or more, sufficient rigidity for supporting the display panel 300 can be achieved, and in an embodiment in which the width T1 is about 0.8 mm or less, sufficient elasticity can be maintained within the limits in which the display device 1 can be folded. However, embodiments of the present disclosure are not necessarily limited thereto and the width T1 of each of the bars BAR1 may vary.

In an embodiment, spacing S1 between adjacent first support member bars SBAR1 of the plurality of first support member bars SBAR1 included in the first support member 610 may be in a range of about 0.5 mm to about 2 mm. For example, the spacing between the plurality of first support member bars SBAR1 may be the width of the first support member slit SSLT.

In an embodiment in which the spacing between the first support member bars SBAR1 is about 0.5 mm or more, impact force from the outside can be sufficiently mitigated. In addition, when the spacing S1 between the bars BAR1 is about 0.8 mm or less, the display panel 300 can be supported in an unfolded state of the display device 1 and the stress exerted on the panel support 600 may be reduced in a folded state of the display device 1, so that sufficient elasticity can be maintained within the limits in which the display device 1 can be folded. However, embodiments of the present disclosure are not necessarily limited thereto and the width T1 of each of the plurality of first support member bars SBAR1 may vary.

Referring to FIG. 9, the second support member 620 may include a plurality of second support member bars SBAR2 and a plurality of second support member slits SSLT2 defined by the spaces between the plurality of second support member bars SBAR2.

In an embodiment, in the second support member 620, the second support member bars SBAR2 and the second support member slits SSLT2 may be alternately arranged along the fourth direction DR4. For example, the second support member bars SBAR2 may be disposed to be spaced apart from one another along the fourth direction DR4 with the second support member slits SSLT2 respectively interposed between every two adjacent second support member bars SBAR2 and thus form a stripe pattern extending in the fifth direction DR5 in plan view.

In an embodiment, each of the plurality of second support member bars SBAR2 may have a bar shape extending in the fifth direction DR5 in a plan view and may be inclined at both ends. In an embodiment, the plurality of second support member bars SBAR2 may have different shapes and sizes from one another.

For example, some of the second support member bars SBAR2 may have an identical shape and size, and others may have different shapes and sizes.

In an embodiment, some of the second support member bars SBAR2 may have a short side of the same length in the second direction DR2 and a short side of the same length in the first direction DR1 and long sides of different lengths in the fifth direction DR5. In addition, some of the second support member bars SBAR2 may have short sides of the same length in the second direction DR2 and long sides of the same length in the fifth direction DR5.

The second support member slits SSLT2 may have the same shape as the second support member bars SBAR2. Each of the plurality of second support member slits SSLT1 may be a hole penetrating the panel support 600 in the third direction DR3.

Like the second support member bars SBAR2, some of the second support member slits SSLT2 may have the identical shape and size, and others may have different shapes and sizes.

In an embodiment, the width T2 of each of the plurality of second support member bars SBAR2 included in the second support member 620 and the spacing S2 between the second support member bars SBAR2 may be, respectively, the same as the width T1 of each of the plurality of first support member bars SBAR1 included in the first support member 610 and the spacing S1 between the first support member bars SBAR1 described above. However, embodiments of the present disclosure are not necessarily limited thereto.

Referring to FIG. 10, in an embodiment, in the third support member 630, the third support member bars SBAR3 and the third support member slits SSLT3 may be alternately arranged along the fifth direction DR5. For example, the third support member bars SBAR3 may be disposed to be spaced apart from one another along the fifth direction DR5 with the third support member slits SSLT3 respectively interposed between every two adjacent third support member bars SBAR3 and thus form a stripe pattern extending in the fourth direction DR4 in a plan view.

Each of the plurality of third support member slits SSLT3 may be a hole penetrating the panel support 600 in the third direction DR3.

The above descriptions of the second support member bars SBAR2 and the second support member slits SSLT2 are equally applicable to the third support member bars SBAR3 and the third support member slits SSLT3 except for the arrangement direction. Therefore, descriptions regarding the shape and size of each of the third support member bars SBAR3 and the third support member slits SSLT3, the width T3 of each of the third support member bar SBAR3, and the spacing S3 between the third support member bars SBAR3 will be omitted for convenience of explanation.

FIG. 11 is a perspective view illustrating a panel support according to an embodiment of the present disclosure.

Referring to FIG. 11, a panel support 600 includes a first support member 610, a second support member 620, and a third support member 630, each of which has a predetermined thickness, and the first support member 610, the second support member 620, and the third support member 630 are sequentially stacked (e.g., in the third direction DR3), which allows the panel support 600 to have a three-dimensional shape. For example, the panel support 600 may have a three-dimensional shape in which two surfaces are respectively disposed on both sides in the first direction DR1, on both sides in the second direction DR2, and on both sides in the third direction DR3.

For example, the panel support 600 may include a first side surface positioned on a second side in the second direction DR2, a second side surface positioned on a first side in the first direction DR1, a third side surface positioned on a first side in the second direction DR2, a fourth side surface positioned on a second side in the first direction DR1, an upper surface positioned on a first side in the third direction DR3, and a lower surface positioned on a second side in the third direction DR3. In an embodiment, the first side surface may be substantially the same as the third side surface, the second side surface may be substantially the same as the fourth side surface, and the upper surface may be substantially the same as the lower surface.

In an embodiment, the length of the panel support 600 in the first direction DR1 may be shorter than the length in the second direction DR2. However, embodiments of the present disclosure are not necessarily limited thereto. For example, in some embodiments, the length of the panel support 600 in the first direction DR1 may be longer than the length in the second direction DR2.

Figure 12:
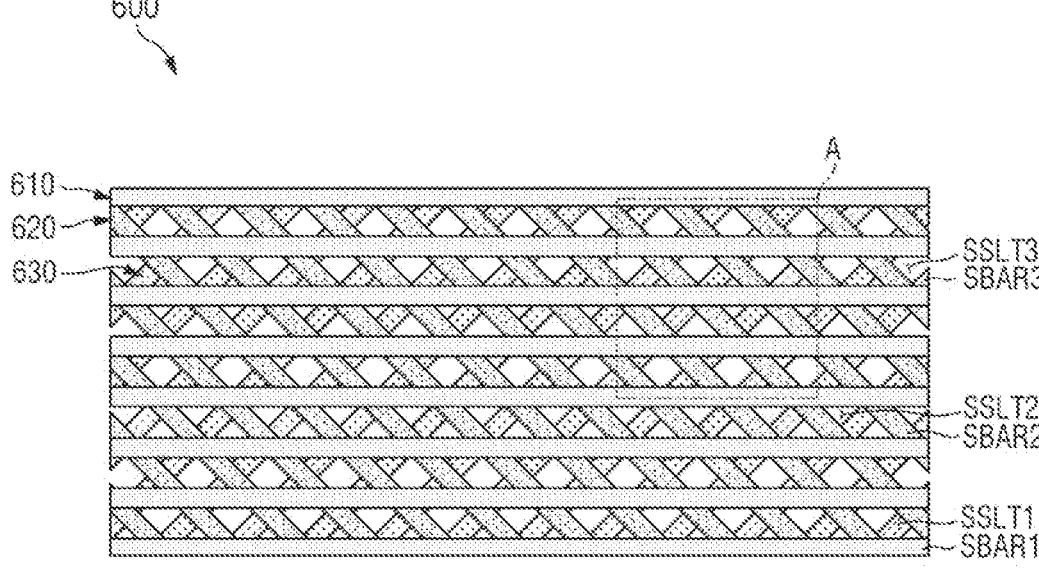
FIG. 12 is a plan view of a panel support according to an embodiment of the present disclosure.
Figure 12:
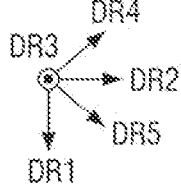
Figure 13:
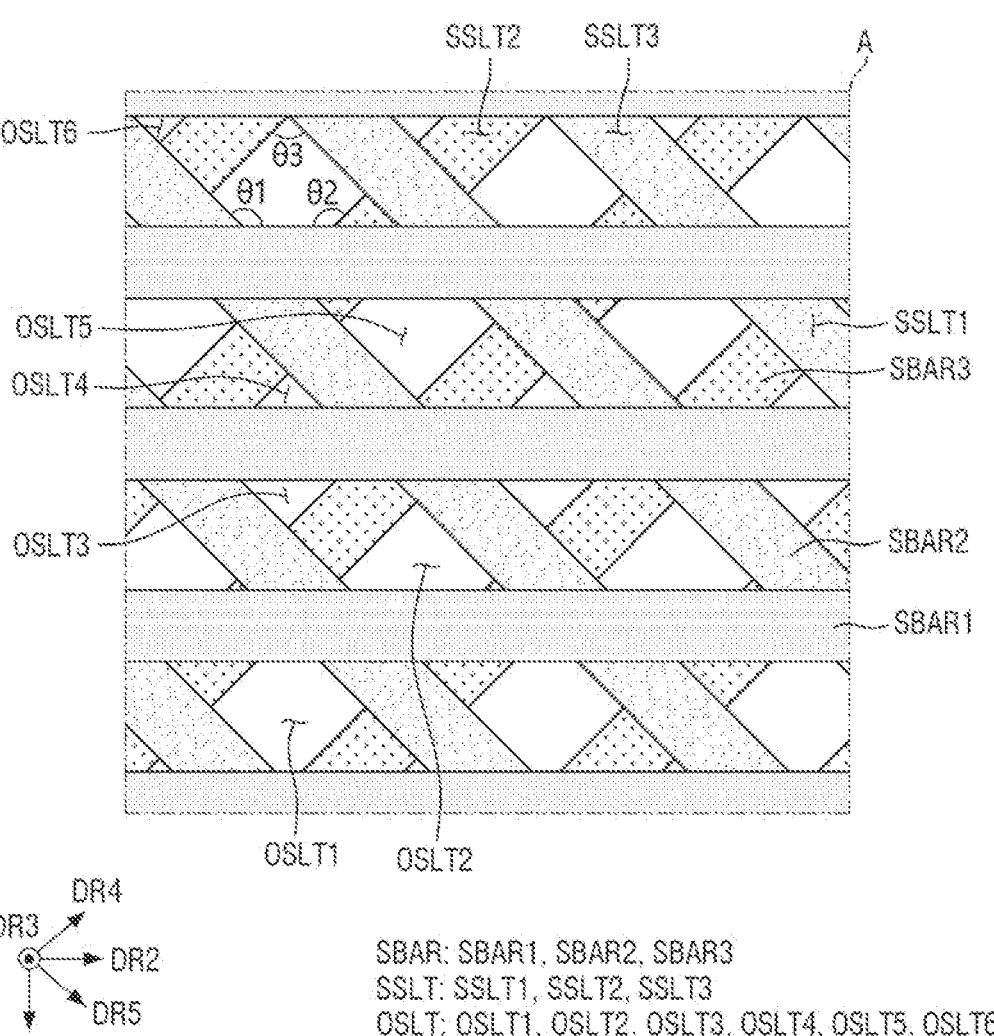
FIG. 13 is an enlarged view of portion A of FIG. 12 according to an embodiment of the present disclosure.

FIG. 12 is a plan view of a panel support according to an embodiment of the present disclosure. FIG. 13 is an enlarged view of portion A of FIG. 12.

Referring to FIGS. 12 and 13, a display support 600 may include a first support member 610 including a plurality of first support member bars SBAR1 and a plurality of first support member slits SSLT1, a second support member 620 including a plurality of second support member bars SBAR2 and a plurality of second support member slits SSLT2, a third support member 630 including a plurality of third support member bars SBAR3 and a plurality of third support member slits SSLT3, a plurality of first overlapping slits OSLT1, a plurality of second overlapping slits OSLT2, a plurality of third overlapping slits OSLT3, a plurality of fourth overlapping slits OSLT4, a plurality of fifth overlapping slits OSLT5, and a plurality of sixth overlapping slits OSLT6.

As described above, the panel support 600 may have a mesh structure in a plan view, which is formed the plurality of support member bars SBAR and the plurality of support member slits SSLT that intersect each other in different directions and overlap each other in the third direction DR3.

Referring to FIGS. 12 and 13, in an embodiment, the panel support 600 may include a plurality of first overlapping slits OSLT1, a plurality of second overlapping slits OSLT2, a plurality of third overlapping slits OSLT3, a plurality of fourth overlapping slits OSLT4, a plurality of fifth overlapping slits OSLT5, and a plurality of sixth overlapping slits OSLT6. The first to sixth overlapping slits SSLT1 to SSLT6 are defined by regions in which a plurality of first support member slits SSLT1 included in a first support member 610, a plurality of second support member slits SSLT2 included in a second support member 620, and a plurality of third support member slits SSLT3 included in a third support member 630 intersect and overlap one another in the third direction DR3. Each of the plurality of overlapping slits OSLT may be a hole penetrating the panel support 600 in the third direction DR3.

The plurality of overlapping slits OSLT may be defined by regions in which the first support member slits SSLT1 extending in the second direction DR2, the second support member slits SSLT2 extending in the fifth direction DR5, and the third support member slits SSLT3 extending in the fourth direction DR4 overlap one another in the third direction DR3. The plurality of overlapping slits OSLT may have different shapes from each other in plan view. For example, at least two of a plurality of sets of overlapping slits OSLT may have different shapes from each other.

For example, the first overlapping slits OSLT1 may each have a hexagonal shape in plan view, the second overlapping slits OSLT2 and the fifth overlapping slits OSLT5 may each have a pentagonal shape in plan view, and the third overlapping slits OSLT3, the fourth overlapping slits OSLT4, and the sixth overlapping slits OSLT6 may each have a triangular shape in plan view.

In an embodiment, the third overlapping slits OSLT3 may have a triangular shape having an area that is larger than those of the fourth overlapping slits OSLT4 and the sixth overlapping slits OSLT6, and the second overlapping slits OSLT2 and the fifth overlapping slits OSLT5 may have different pentagonal shapes from each other in plan view.

However, embodiments of the present disclosure are not necessarily limited thereto and the shapes of the overlapping slits OSLT may vary from a triangular shape, a pentagonal shape, and a hexagonal shape. In an embodiment, each of the overlapping slits OSLT may have a different shape other than the above-described shapes, according to the arrangement form of the first support member slits SSLT1, the second support member slits SSLT2, and the third support member slits SSLT3, the stacking order of the first support member 610, the second support member 620, and the third support member 630, and the variation in the width of each of the first support member slits SSLT1, the second support member slits SSLT2, and the third support member slits SSLT3.

Referring to FIG. 13, in an embodiment, when the plurality of first support member bars SBAR1 included in the first support member 610 overlap the plurality of second support member bars SBAR2 included in the second support member 620 in the third direction DR3, a first angle θ1 which is an angle in a plan view between the first support member bars SBAR1 and the second support member bars SBAR2 may be in a range of about 115 to about 125 degrees.

The first angle θ1 may be an angle measured in a clockwise direction from the second support member bar SBAR2 to the first support member bar SBAR1. For example, the first angle θ1 may be an obtuse angle among angles between the second support member bars SBAR2 and the first support member bars SBAR1 in a plan view.

For example, the first angle θ1 between the first support member bars SBAR1 and the second support member bars SBAR2 in a plan view may be about 120 degrees.

In an embodiment, when the plurality of first support member bars SBAR1 included in the first support member 610 overlap the plurality of third support member bars SBAR3 included in the third support member 630 in the third direction DR3, a second angle θ2 which is an angle in a plan view between the first support member bars SBAR1 and the third support member bars SBAR3 may be in a range of about 115 to about 125 degrees.

The second angle θ2 may be an angle measured in a counterclockwise direction from the third support member bar SBAR3 to the first support member bar SBAR1. For example, the second angle θ2 may be an obtuse angle among angles between the third support member bars SBAR3 and the first support member bars SBAR1 in a plan view.

For example, the second angle θ2 between the first support member bars SBAR1 and the third support member bars SBAR3 in a plan view may be about 120 degrees.

In an embodiment, when the plurality of second support member bars SBAR2 included in the second support member 620 overlap the plurality of third support member bars SBAR3 included in the third support member 630 in the third direction DR3, a third angle θ3 which is an angle in a plan view between the second support member bars SBAR2 and the third support member bars SBAR3 may be in a range of about 55 to about 65 degrees.

For example, the third angle θ3 between the second support member bars SBAR2 and the third support member bars SBAR3 in a plan view may be about 60 degrees.

However, the above-described angles formed when the plurality of first support member bars SBAR1, the second support member bars SBAR2, and the third support member bars SBAR3 overlap each other in the third direction are not necessarily limited to the aforementioned ranges of angles. In some embodiments, the angles may vary according to the arrangement form of the support member bars SBAR included in the first support member 610, the second support member 620, and the third support member 630, the stacking order of the first support member 610, the second support member 620, and the third support member 630, and the like.

Figure 14:
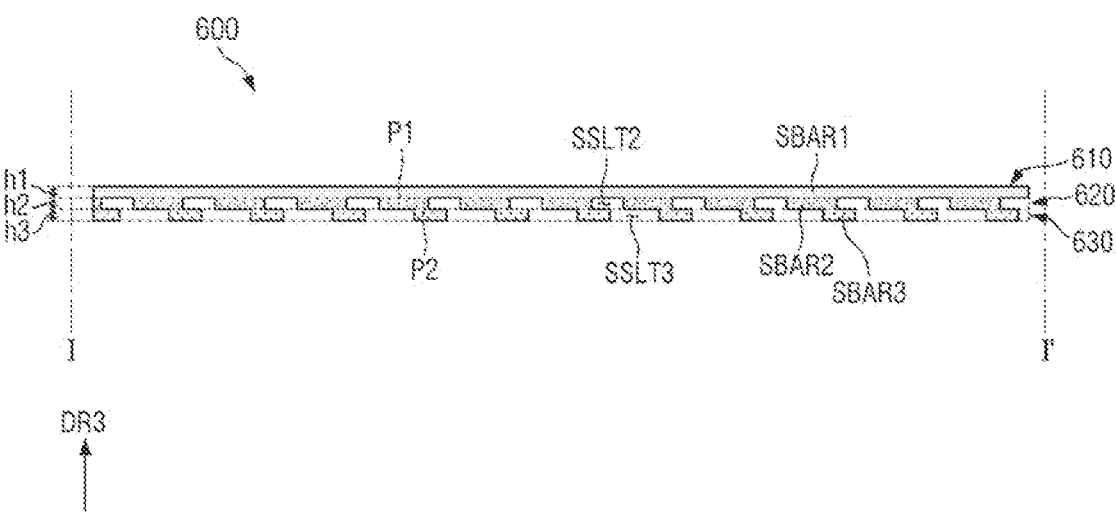
FIG. 14 is a cross-sectional view of a panel support taken along line I-I' of FIG. 11 according to an embodiment of the present disclosure.

FIG. 14 is a cross-sectional view taken along line I-I' of FIG. 11.

Referring to FIG. 14, in an embodiment, a thickness h1 of the first support member 610, a thickness h2 of the second support member 620, and a thickness h3 of the third support member 630 may each be in a range of about 0.05 mm to about 0.2 mm.

When the thickness h1 of the first support member 610, the thickness h2 of the second support member 620, and the thickness h3 of the third support member 630 are each about 0.05 mm or more, sufficient rigidity for supporting the display panel 300 may be provided, and when the thickness of each of the first to third support members 610 to 630 is about 0.2 mm or less, sufficient elasticity can be maintained within the limits in which the display device 1 can be folded. However, the thickness h1 of the first support member 610, the thickness h2 of the second support member 620, and the thickness h3 of the third support member 630 are not necessarily limited to the range of values described above.

In an embodiment, thickness h1 of the first support member 610, the thickness h2 of the second support member 620, and the thickness h3 of the third support member 630 may be identical to one another. However, embodiments of the present disclosure are not necessarily limited thereto. In some embodiments, the thickness h1 of the first support member 610, the thickness h2 of the second support member 620, and the thickness h3 of the third support member 630 may be different from one another.

Referring to FIG. 14, in an embodiment, the panel support 600 may include a plurality of first contact portions P1 in which the first support member bars SBAR1 included in the first support member 610 are in direct contact with the second support member bars SBAR2 included in the second support member 620 and a plurality of second contact portions P2 in which the second support member bars SBAR2 included in the second support member 620 are in direct contact with the third support member bars SBAR3 included in the third support member 630.

At the plurality of first contact portions P1, the first support member bars SBAR1 included in the first support member 610 are connected to the second support member bars SBAR2 included in the second support member 620. At the plurality of second contact portions P2, the second support member bars SBAR2 included in the second support member 620 are connected to the third support member bars SBAR3 included in the third support member 630.

For example, in an embodiment at the plurality of first contact portions P1, the first support member bars SBAR1 and the second support member bars SBAR2 may be connected and stacked using a metal bonding technique such as brazing or the like. Similarly, at the plurality of second contact portions P2, the second support member bars SBAR2 and the third support member bars SBAR3 may be connected and stacked using a metal bonding technique such as brazing or the like. However, the metal bonding technique such as brazing is merely illustrative and embodiments of the present disclosure are not necessarily limited thereto. In some embodiments, the first support member bars SBAR1 and the second support member bars SBAR2 and the second support member bars SBAR2 and the third support member bars SBAR3 may be connected to each other through another metal bonding technique or an adhesive layer such as PSA or the like.

In an embodiment, in a cross-sectional view of the second support member 620 disposed on the rear surface of the first support member bars SBAR1 included in the first support member 610, the second support member bars SBAR2 and the second support member slits SSLT2 may be alternately arranged along the second direction DR2. In a cross-sectional view of the third support member 630 disposed on the rear surface of the second support member, the third support member bars SBAR3 and the third support member slits SSLT3 may be alternately arranged along the second direction DR2.

For example, as the rear surfaces of the first support member bars SBAR1 included in the first support member 610 and the upper surfaces of the second support member bars SBAR2 included in the second support member 620 are connected to each other at the first contact portions P1 where the first support member bars SBAR1 and the second support member bars SBAR2 intersect and overlap each other, the second support member 620 may be stacked on the rear surface of the first support member 610.

As the rear surfaces of the second support member bars SBAR2 included in the second support member 620 and the upper surfaces of the third support member bars SBAR3 included in the third support member 630 are connected to each other at the second contact portions P2 where the second support member bars SBAR2 and the third support member bars SBAR3 intersect and overlap each other, the third support member 630 may be stacked on the rear surface of the second support member 620.

In addition, a part of the second support member slits SSLT2 included in the second support member 620 and a part of the third support member slits SSLT3 included in the third support member 630 may intersect and overlap each other in the third direction DR3.

As shown in FIG. 14, when the first support member bars SBAR1, the second support member bars SBAR2, and the third support member bars SBAR3 that are made of a material having high rigidity are connected only at the first contact portions P1 and the second contact portions P2 and stacked through the metal bonding technique such as brazing or the like, the high rigidity and high elasticity due to the mesh pattern formed by the plurality of support member bars SBAR and the plurality of support member slits SSLT included in each of the first support member 610, the second support member 620, and the third support member 630 may be increased.

Thus, the panel support 600 having the mesh pattern may have a high rigidity and a high elasticity for the support of the display panel 300 and exhibit the same characteristics in any direction.

Hereinafter, embodiments will be described with reference to FIGS. 15 to 22. In the following embodiments, descriptions of the same configurations as those in the embodiments described above will be omitted or simplified, and the following description will focus on differences for convenience of explanation.

Figure 15:
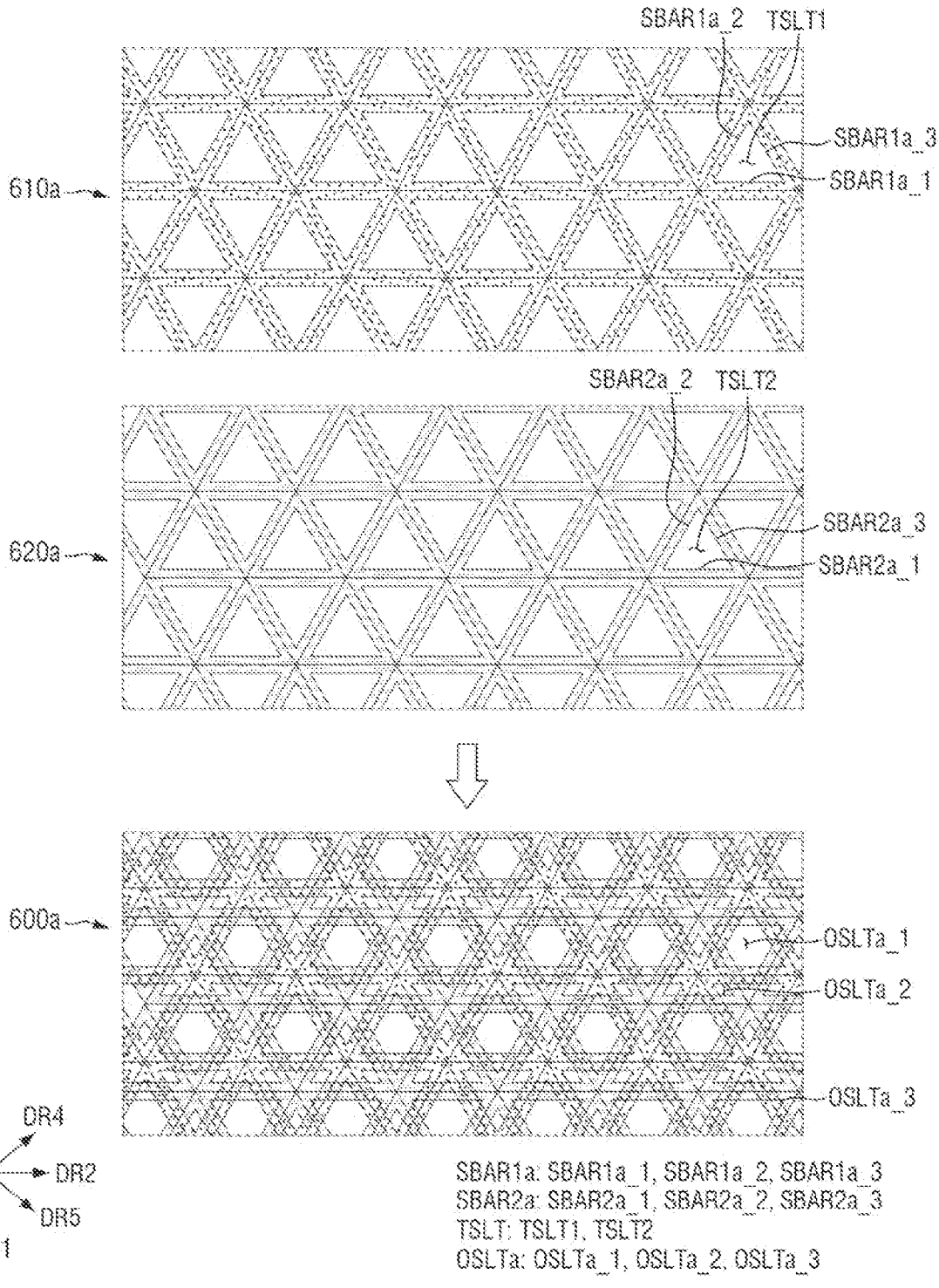
FIG. 15 is a plan view of a panel support according to an embodiment of the present disclosure.

FIG. 15 is a plan view of a panel support according to another embodiment of the present disclosure.

Referring to FIG. 15, a panel support 600a according to an embodiment is different from the panel support 600 shown in FIGS. 6 to 10 in that the panel support 600a includes a first support member 610a and a second support member 620a and each of the first support member 610a and the second support member 620a includes, in plan view, a pattern different from that of the panel support 600 shown in FIGS. 8 to 10.

The first support member 610a may include a plurality of first-first support member bars SBAR1*a*_1, first-second support member bars SBAR1*a*_2, first-third support member bars SBAR1*a*_3, and first triangular slits TSLT1 defined by the first-first support member bars SBAR1*a*_1, the first-second support member bars SBAR1*a*_2, and the first-third support member bars SBAR1*a*_3. The second support member 620a may include second-first support member bars SBAR2*a*_1, second-second support member bars SBAR2*a*_2, second-third support member bars SBAR2*a*_3, and second triangular slits TSLT2 defined by the second-first support member bars SBAR2*a*_1, the second-second support member bars SBAR2*a*_2, and the second-third support member bars SBAR2*a*_3.

For example, the first-first support member bars SBAR1*a*_1 included in the first support member 610a may extend in the second direction DR2, the first-second support member bars SBAR1*a*_2 may be disposed at ends on a second side of the first-first support member bars SBAR1*a*_1 and may extend in the fourth direction DR4, and the first-third support member bars SBAR1*a*_3 may be disposed at ends on a first side of the first-first support member bars SBAR1*a*_1 and may extend in the fifth direction DR5, and may intersect the first-second support member bars SBAR1*a*_2 extending in the fourth direction DR4 from the ends on the second side of the first-first support member bars SBAR1*a*_1.

In addition, the first support member 610a may include the first triangular slits TSLT1 defined by the first-first support member bars SBAR1*a*_1, the first-second support member bars SBAR1*a*_2, and the first-third support member bars SBAR1*a*_3.

The second-first support member bars SBAR2*a*_1, the second-second support member bars SBAR2*a*_2, and the second-third support member bars SBAR2*a*_3 included in the second support member 620a may also be arranged in the same manner as the first support member bars SBAR1*a*. The second support member 620a may include the second triangular slits TSLT2 defined by the second-first support member bars SBAR2*a*_1, the second-second support member bars SBAR2*a*_2, and the second-third support member bars SBAR2*a*_3.

The second support member 620a may be alternately disposed on the rear surface of the first support member 610a in the second direction DR2 and the second support member bars SBAR2*a* may be stacked while intersecting and overlapping each other.

For example, one of the first triangular slits TSLT1 included in the first support member 610a may overlap one of the second triangular slits TSLT2 included in the second support member 620a in the third direction DR3.

In addition, intersections where the first-first support member bars SBAR1*a*_1, the first-second support member bars SBAR1*a*_2, and the first-third support member bars SBAR1*a*_3 included in the first support member 610a may overlap one of the second triangular slits TSLT2 included in the second support member 620a in the third direction DR3.

Figure 16:
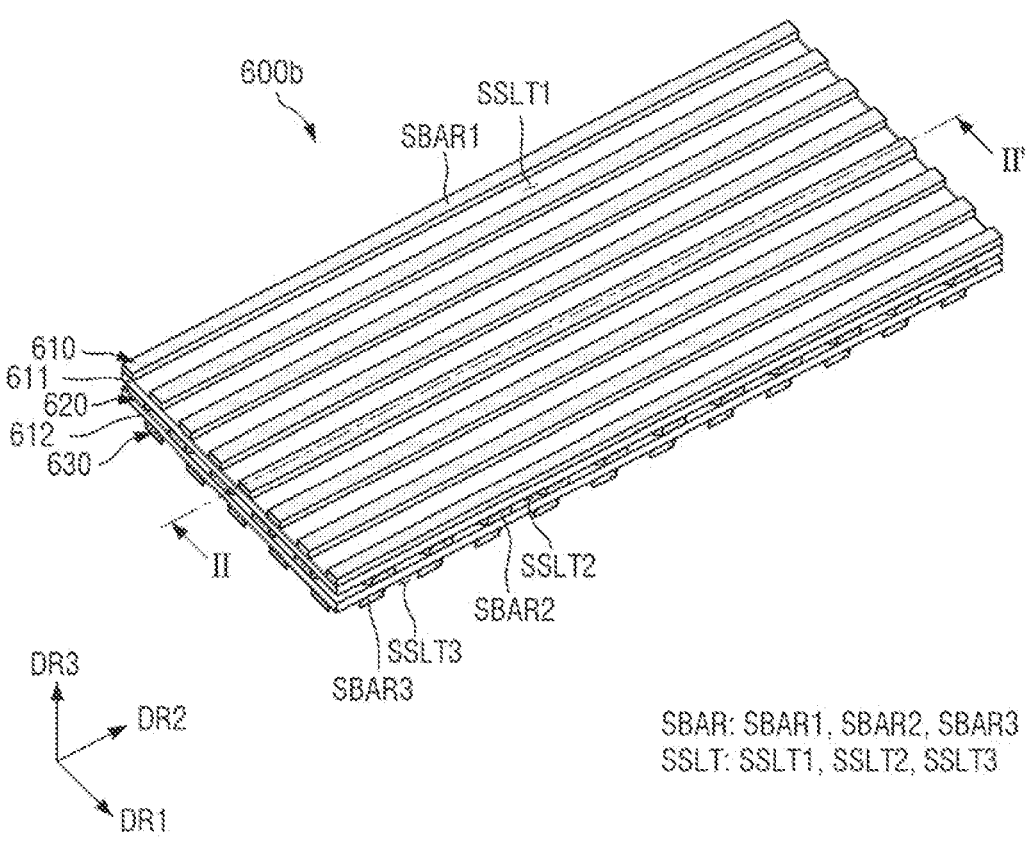
FIG. 16 is a perspective view of a panel support according to an embodiment of the present disclosure.
Figure 17:
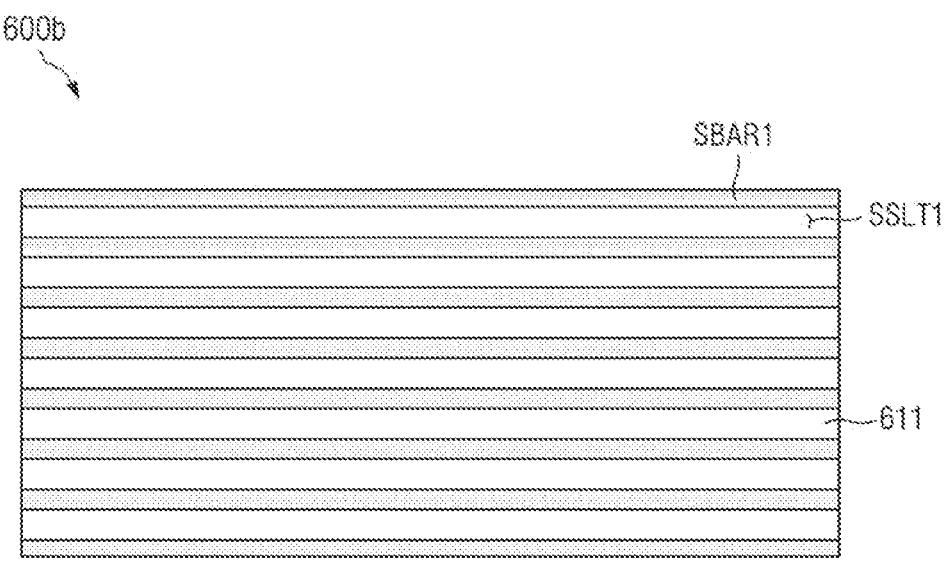
FIG. 17 is a plan view of a panel support according to an embodiment of the present disclosure.
Figure 17:
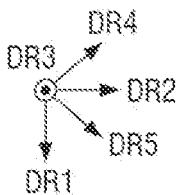
Figure 18:
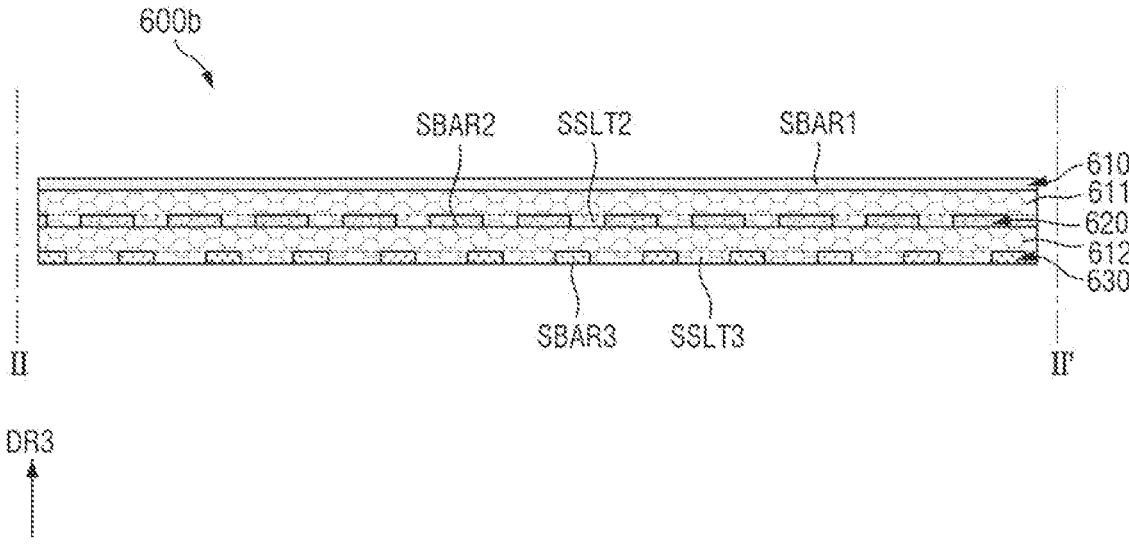
FIG. 18 is a cross-sectional view of a panel support taken along line II-II' of FIG. 16 according to an embodiment of the present disclosure.

FIG. 16 is a perspective view of a panel support according to an embodiment of the present disclosure. FIG. 17 is a plan view of a panel support according to an embodiment of the present disclosure. FIG. 18 is a cross-sectional view taken along line II-II' of FIG. 16.

Referring to FIG. 16, a panel support 600b according to an embodiment is different from the panel support 600 according to an embodiment in that the panel support 600b further includes a first adhesive layer 611 and a second adhesive layer 612.

For example, the first adhesive layer 611 may be disposed between a first support member 610 and a second support member 620 to bond a plurality of first support member bars SBAR1 included in the first support member 610 to a plurality of second support member bars SBAR2 included in the second support member 620. The second adhesive layer 612 may be disposed between the second support member 620 and a third support member 630 to bond the plurality of second support member bars SBAR2 included in the second support member 620 to a plurality of third support member bars SBAR3 included in the third support member 630.

In an embodiment, the first adhesive layer 611 and the second adhesive layer 612 may each be a PSA. However, embodiments of the present disclosure are not necessarily limited thereto.

The first adhesive layer 611 and the second adhesive layer 612 may each be formed as a single layer or a stack of multiple adhesive layers, and may be a base member having bonding layers attached on both surfaces thereof, like a double-sided tape.

In some embodiments, the first adhesive layer 611 and the second adhesive layer 612 may include a silicone adhesive or an acrylic adhesive. However, the material of the first adhesive layer 611 and the second adhesive layer 612 is not necessarily limited thereto. For example, various other well-known materials or compositions may also be applicable as the material of the first and second adhesive layers 611 and 612.

Referring to FIGS. 16 and 17, unlike the panel support 600 according to an embodiment, the first adhesive layer 611 is disposed between the first support member 610 and the second support member 620, and thus a plurality of first support member slits SLT1 may be filled with the first adhesive layer 611.

Referring to FIG. 18, in an embodiment the rear surfaces of the first support member bars SBAR1 included in the first support member 610 and the upper surfaces of the second support member bars SBAR2 included in the second support member 620 may be bonded and stacked together by the first adhesive layer 611 without being directly connected to each other, and the plurality of second support member slits SSLT2 included in the second support member 620 may be filled with the first adhesive layer 611.

Also, the rear surface of the second support member bar SBAR2 included in the second support member 620 and the upper surfaces of the third support member bars SBAR3 included in the third support member 630 may be bonded and stacked together by the second adhesive layer 612 without being directly connected to each other, and the plurality of third support member slits SSLT3 included in the third support member 630 may be filled with the second adhesive layer 612. However, embodiments of the present disclosure are not necessarily limited thereto. For example, in an embodiment, the plurality of second support member slits SSLT2 included in the second support member 620 may be filled with the second adhesive layer 612.

The panel support 600b according to embodiments of FIGS. 16 to 18 may have the first adhesive layer 611 disposed between the first support member 610 and the second support member 620 and the second adhesive layer 612 disposed between the second support member 620 and the third support member 630, thereby increasing the bonding strength between the first support member 610 and the second support member 620 and between the second support member 620 and the third support member 630.

Figure 19:
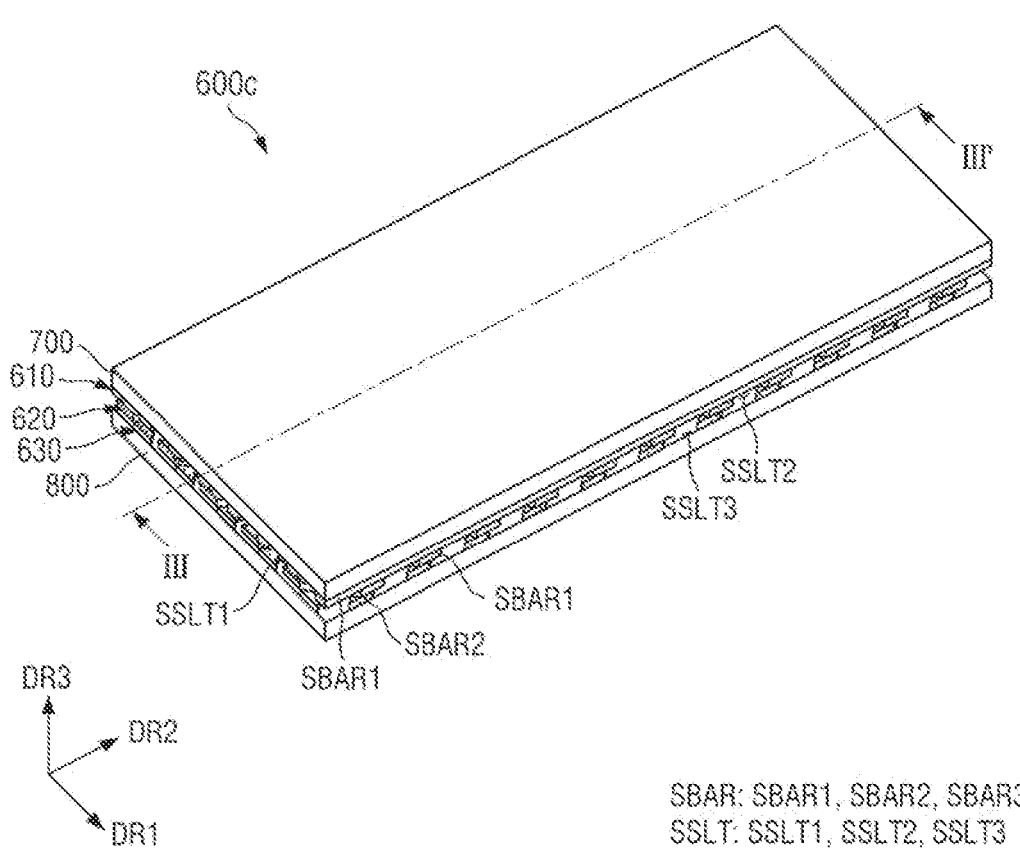
FIG. 19 is a perspective view of a panel support according to an embodiment of the present disclosure.
Figure 20:
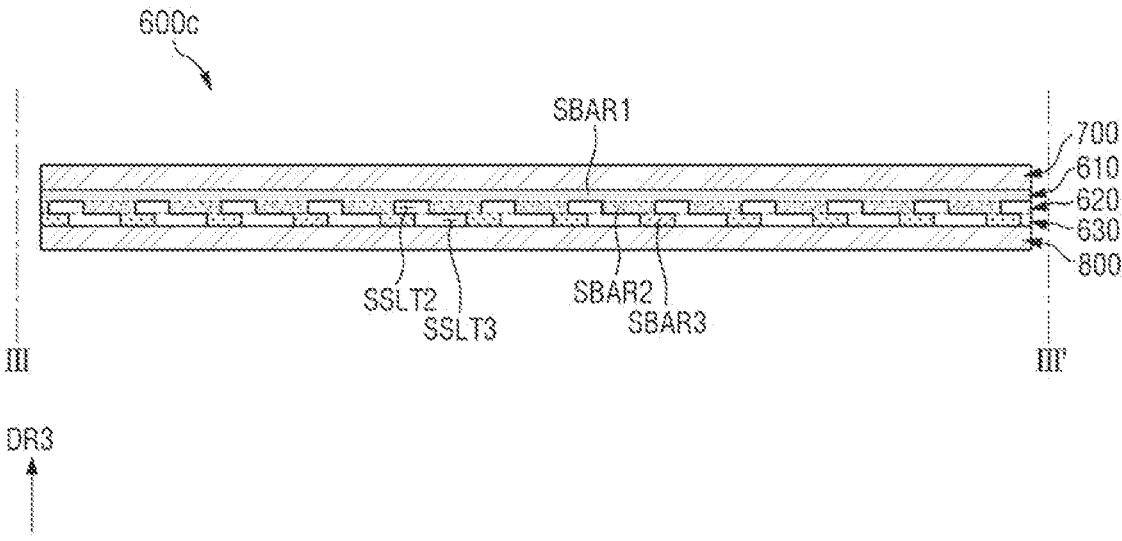
FIG. 20 is a cross-sectional view of a panel support taken along line III-III' of FIG. 19 according to an embodiment of the present disclosure.

FIG. 19 is a perspective view of a panel support according to an embodiment of the present disclosure. FIG. 20 is a cross-sectional view taken along line QI-III' of FIG. 19.

Referring to FIGS. 19 and 20, a panel support 600c according to an embodiment may further include a first protective member 700 disposed on an upper surface of a first support member 610 and a second protective member 800 disposed on a rear surface of a third support member 630.

In an embodiment, the first protective member 700 and the second protective member 800 may each be a polymer film. For example, the polymer film may include at least one of polyethylene terephthalate (PET), polyethylene naphthalate (PEN), polyether sulfone (PES), polyimide (PI), polyarylate (PAR), polycarbonate (PC), polymethyl methacrylate (PMMA), or a cycloolefin copolymer (COC) resin.

The first protective member 700 and the second protective member 800 may be bonded to the upper surface of the first support member 610 and the rear surface of the third support member 630, respectively, via an adhesive member, such as a PSA.

The first protective member 700 and the second protective member 800 may protect the first support member 610, a second support member 620, and the third support member 630, which are interposed therebetween, from an external impact and may simultaneously increase the bonding strength between the panel support 600c with other stacked structures by flattening an upper surface and a lower surface of the panel support 600c.

In an embodiment, due to a plurality of first support member bars SBAR1 included in the first support member 610 and a plurality of third support member bars SBAR3 included in the third support member 630, the upper surface of the first support member 610 and the lower surface of the third support member 630 may have patterns that protrude in the third direction, and thus a separation may occur due to the protruding patterns when they are bonded with other stacked structures.

Therefore, the first protective member 700 may be disposed on the upper surface of the first support member 610 and the second protective member 800 may be disposed on the lower surface of the third support member 630, so that the protruding patterns may be provided with a flat surface and a separation may be prevented from occurring when the first support member 610 and the third support member 630 are bonded with other stacked structures.

Figure 21:
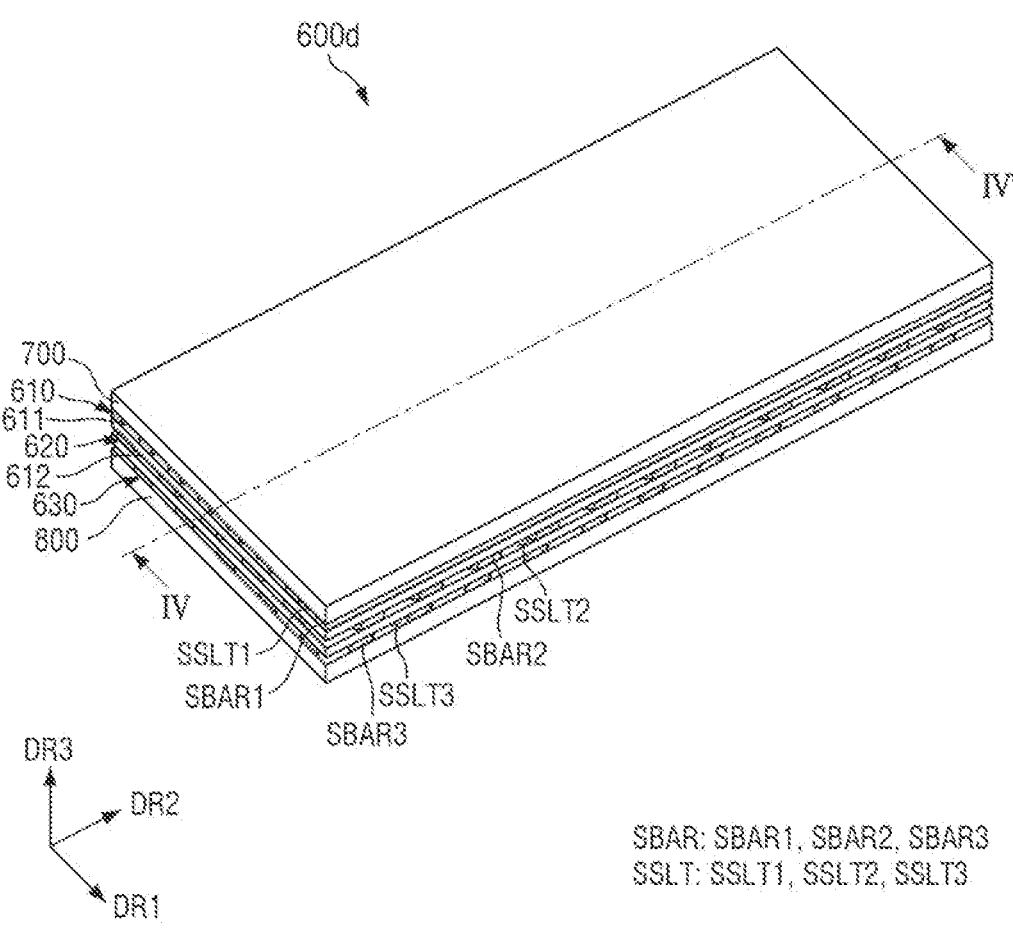
FIG. 21 is a perspective view of a panel support according to an embodiment of the present disclosure.
Figure 22:
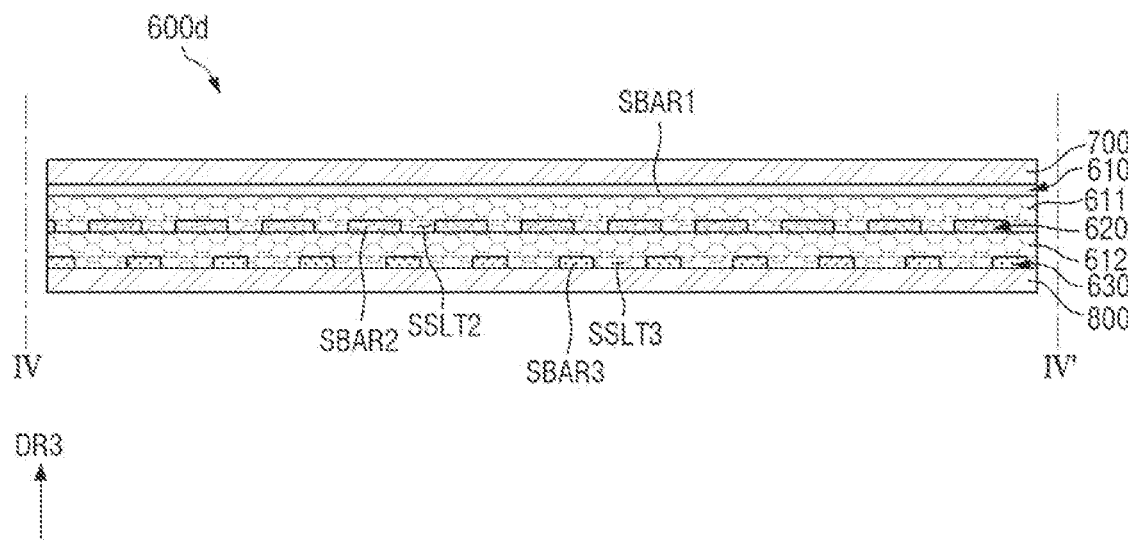
FIG. 22 is a cross-sectional view of a panel support taken along line IV-IV' of FIG. 21 according to an embodiment of the present disclosure.

FIG. 21 is a perspective view of a panel support according to an embodiment of the present disclosure. FIG. 22 is a cross-sectional view taken along line IV-IV' of FIG. 21.

Referring to FIGS. 21 and 22, a panel support 600d according to an embodiment may further include a first protective member 700 disposed on an upper surface of a first support member 610, a second protective member 800 disposed on a lower surface of a third support member 630, a first adhesive layer 611 disposed between the first support member 610 and a second support member 620, and a second adhesive layer 612 disposed between the second support member 620 and the third support member 630.

The panel support 600d of FIGS. 21 and 22 may have increased bonding strength between the first support member 610 and the second support member 620 and between the second support member 620 and the third support member 630 due to the first adhesive layer 611 and the second adhesive layer 612, and may have increased bonding strength with other stacked structures since the upper and lower surfaces of the panel support 600d are flattened by the first protective member 700 and the second protective member 800.

According to the display device in accordance with an embodiment, it is possible to resolve a problem in which a panel support needs to be separately designed or attached depending on a deformable region or direction of a flexible panel and to manufacture a panel support that is universally applicable to a flexible display, such as a foldable display device, a rollable display device, a stretchable display device, a slidable display device, and the like, irrespective of the deformable region or direction of the flexible panel.

However, effects of embodiments of the present disclosure are not restricted to the one set forth herein. The above and other effects of embodiments of the present disclosure will become more apparent to one of daily skill in the art to which the embodiments pertain by referencing the claims.

In concluding the detailed description, those skilled in the art will appreciate that many variations and modifications can be made to the described embodiments without substantially departing from the principles of the present disclosure. Therefore, the described embodiments of the present disclosure are used in a generic and descriptive sense only and not for purposes of limitation.

What is claimed:

1. A display device comprising:
a display panel and a panel support, wherein the display panel includes a first surface and a second surface opposite to the first surface;
the panel support is disposed on the first surface, wherein the panel support comprises:

a first support member including first support portions that extend in a first direction, the first support portions are spaced apart from each other;

a second support member including second support portions that extend in a second direction intersecting the first direction, the second support portions are spaced apart from each other, a third support member including third support portions that extend in a third direction intersecting the first direction and the second direction, the third support portions are spaced apart from each other, wherein the second support member is disposed between the first support member and the third support member, wherein the second support member is attached to the first support member and the third support member, wherein the panel support further comprises:

first slits defined by spaces between adjacent first support portions of the first support portions;

second slits defined by spaces between adjacent second support portions of the second support portions;

third slits defined by spaces between adjacent third support portions of the third support portions; and overlapping slits comprising regions that the first slits, the second slits, and the third slits overlap each other in a thickness direction.

2. The display device of claim 1, wherein:

at least one of the first support portions is in direct contact with at least one of the second support portions, respectively; and at least one of the second support portions is in direct contact with at least one of the third support portions, respectively.

3. The display device of claim 1, wherein at least one of the first support member, the second support member, and the third support member has a different thickness from other support members of the first to third support members.

4. The display device of claim 1, wherein the first support member, the second support member, and the third support member have a thickness in a range of about 0.05 mm to about 0.2 mm.

5. The display device of claim 1, further comprising:

an upper protective member disposed on the second surface of the display panel; and a window member disposed between the upper protective member and the display panel, wherein the upper protective member and the window member overlap the panel support in a thickness direction.

6. The display device of claim 5, further comprising:

a panel lower protective member disposed on the first surface of the display panel; and a barrier member disposed between the panel lower protective member and the panel support, wherein the panel lower protective member and the barrier member overlap the panel support in the thickness direction.

7. The display device of claim 1, wherein at least one of the first support portions, the second support portions, and the third support portions has a different width from other support portions of the first to third support portions.

8. The display device of claim 1, wherein the first support portions, the second support portions, and the third support portions have a width in a range of about of 0.2 mm to about 0.8 mm.

9. The display device of claim 1, wherein at least two of the overlapping slits have different shapes from each other.

10. The display device of claim 1, wherein:

a first angle in a plan view between the first support portions and the second support portions and a second angle in the plan view between the second support portions and the third support portions are in a range of about 115 to about 125 degrees; and a third angle in the plan view between the second support portions and the third support portions is in a range of about 55 to about 65 degrees.

11. The display device of claim 1, further comprising:

a first adhesive layer disposed between the first support member and the second support member, wherein the first adhesive layer is further disposed in a space between every two adjacent second support portions of the second support portions.

12. The display device of claim 1, further comprising:

a second adhesive layer disposed between the second support member and the third support member, wherein the second adhesive layer is further disposed in a space between every two adjacent third support portions of the third support portions.

13. The display device of claim 1, wherein:

the first support member includes an upper surface and a lower surface opposite to the upper surface;

the display device further comprises a first protective member disposed on the upper surface of the first support member;

the third support member includes an upper surface and a lower surface opposite to the upper surface; and the display device further comprises a second protective member disposed on the lower surface of the third support member.

14. The display device of claim 1, wherein spacing between the first support portions, spacing between the second support portions, and spacing between the third support portions are different from one another.

15. A display device comprising:

a display panel and a panel support, wherein the display panel includes a first surface and a second surface opposite to the first surface;

the panel support is disposed on the first surface, the panel support comprises a first support member and a second support member;

the first support member includes first support portions extending in a first direction, second support portions extending in a second direction from the first support portions, the second direction intersecting the first direction, and third support portions extending in a third direction from the first support portions or the second support portions, the third direction intersecting the first direction and the second direction, the second support member includes fourth support portions extending in the first direction, fifth support portions extending in the second direction from the fourth support portions, and sixth support portions extending in the third direction from the fourth support portions or the fifth support portions; and the first support member is attached to the second support member.

16. The display device of claim 15, wherein:

the panel support comprises first slits defined by spaces between adjacent first support portions of the first support portions, adjacent second support portions of the second support portions, and adjacent third support portions of the third support portions; and second slits defined by adjacent fourth support portions of the fourth support portions, adjacent fifth support portions of the fifth support portions, and adjacent sixth support portions of the sixth support portions.

17. The display device of claim 16, wherein the first slits and the second slits have a triangular shape.

18. The display device of claim 16, wherein at least one of the first slits overlaps at least one of the second slits, respectively, in a thickness direction.

19. A display panel support comprising:

a first support member including first support portions that extend in a first direction, the first support portions are spaced apart from each other;

a second support member including second support portions that extend in a second direction intersecting the first direction, the second support portions are spaced apart from each other;

a third support member including third support portions that extend in a third direction intersecting the first direction and the second direction, the third support portions are spaced apart from each other, wherein the second support member is disposed between the first support member and the third support member, wherein the second support member is attached to the first support member and the third support member, wherein the display panel support further comprises:

first slits defined by spaces between adjacent first support portions of the first support portions;

second slits defined by spaces between adjacent second support portions of second support portions;

third slits defined by spaces between adjacent third support portions of the third support portions; and overlapping slits comprising regions that the first slits, the second slits, and the third slits overlap each other in a thickness direction.

\* \* \* \* \*